United States Patent
Kim et al.

(10) Patent No.: US 9,930,519 B2
(45) Date of Patent: Mar. 27, 2018

(54) METHOD AND APPARATUS FOR CONTROLLING HOME DEVICES ON GROUP BASIS BASED UPON HISTORY OF THE HOME DEVICES

(71) Applicant: Samsung Electronics Co., Ltd., Suwon-si, Gyeonggi-do (KR)

(72) Inventors: Kyung-Jae Kim, Suwon-si (KR); Chang-Hyun Kim, Seoul (KR); Chang-Hyun Lee, Suwon-si (KR); Ji-Yeon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/549,975

(22) Filed: Nov. 21, 2014

(65) Prior Publication Data

US 2015/0140990 A1    May 21, 2015

Related U.S. Application Data

(60) Provisional application No. 61/975,395, filed on Apr. 4, 2014.

(30) Foreign Application Priority Data

Nov. 21, 2013 (KR) .......................... 10-2013-0142341
Aug. 7, 2014 (KR) .......................... 10-2014-0101652

(51) Int. Cl.
*H04M 3/00* (2006.01)
*H04W 8/18* (2009.01)

(52) U.S. Cl.
CPC .................. *H04W 8/186* (2013.01)

(58) Field of Classification Search
CPC .............................. H04W 8/22; H04W 8/186
See application file for complete search history.

(56) References Cited

U.S. PATENT DOCUMENTS

2002/0072369 A1* 6/2002 Sasada ................. H04W 60/04
                                                        455/435.2
2003/0233664 A1* 12/2003 Huang .................. G08C 19/28
                                                        725/132

(Continued)

FOREIGN PATENT DOCUMENTS

| EP | 1496650 B1 | 2/2012 |
|----|------------|--------|
| WO | 2011/053008 A2 | 5/2011 |
| WO | 2013/082628 A2 | 6/2013 |

OTHER PUBLICATIONS

Zhang et al.; Home M2M Networks; Architectures, Standards, and QoS Improvement; Recent Progress in Machine-to-Machine Communications; IEEE Communications Magazine; Apr. 2011.

*Primary Examiner* — Keith Fang
(74) *Attorney, Agent, or Firm* — Jefferson IP Law, LLP

(57) ABSTRACT

A method and apparatus for controlling home devices on a group basis in a home network system are provided. The method includes collecting operation state information about a plurality of home devices, generating control history information about the plurality of home devices based on the collected operation state information, receiving a group control command for a group of home devices from among the plurality of home devices, the group of home devices being set based on the control history information, and controlling operations of the group of home devices according to the received group control command.

20 Claims, 18 Drawing Sheets

(56) References Cited

U.S. PATENT DOCUMENTS

| | | |
|---|---|---|
| 2005/0149758 A1 | 7/2005 | Park |
| 2005/0159823 A1 | 7/2005 | Hayes et al. |
| 2006/0259184 A1* | 11/2006 | Hayes .................... G05B 15/02 |
| | | 700/221 |
| 2009/0288152 A1* | 11/2009 | Huber ................ G06Q 20/1235 |
| | | 726/6 |
| 2012/0078959 A1 | 3/2012 | Cho et al. |
| 2012/0165990 A1 | 6/2012 | McCormack |
| 2012/0271471 A1 | 10/2012 | Lee et al. |
| 2013/0084905 A1* | 4/2013 | Ehara .................... H04W 4/005 |
| | | 455/500 |
| 2013/0183944 A1 | 7/2013 | Mozer et al. |

* cited by examiner

METHOD AND APPARATUS FOR CONTROLLING HOME DEVICES ON GROUP BASIS BASED UPON HISTORY OF THE HOME DEVICES

CROSS-REFERENCE TO RELATED APPLICATION(S)

This application claims the benefit under 35 U.S.C. § 119(e) of a U.S. Provisional application filed on Apr. 4, 2014 in the U.S. Patent and Trademark Office and assigned Ser. No. 61/975,395, and under 35 U.S.C. § 119(a) of a Korean patent application filed on Nov. 21, 2013 in the Korean Intellectual Property Office and assigned Serial number 10-2013-0142341, and of a Korean patent application filed on Aug. 7, 2014 in the Korean Intellectual Property Office and assigned Serial number 10-2014-0101652, the entire disclosure of each of which is hereby incorporated by reference.

TECHNICAL FIELD

The present disclosure relates to a home network system. More particularly, the present disclosure relates to a method and apparatus for controlling operations of home devices on a group basis.

BACKGROUND

A home network system refers to a system that controls a variety of home devices in a home and enables communication between the home devices by interconnecting the home devices by cable or wirelessly. The home network system integrates the home devices through a Home Gate-Way (HGW or H-GW) and thus connects the home devices to an external public data network, for example, an Internet Protocol (IP) network (e.g., the Internet), thereby providing various services in connection to the Internet.

As the types of home devices have become various and users' demands regarding the home devices have been increasing, research has been conducted to increase user convenience by fulfilling various users' demands.

For example, group control of a plurality of home devices in a home network system is under study. In a related-art method for controlling home devices on a group basis, a user sets a situation in which home devices are to be controlled on a group basis and selects home devices corresponding to the situation one by one, so that the home devices may perform user-intended operations.

For example, if the user wants to set 4 situations, back-home, going-out, sleep, and movie-watching and 30 home devices are connected to a home network system, the user should perform 120 (=4×30) device settings in total, for group control. Since more situations are set and more home devices are controlled, the related-art group control method increases user inconvenience and the complexity of User Interfaces (UIs) designed for group control. It is expected that the number of home devices controlled in a home network system and the number of situations to be set for group control will increase in view of the development of a future smart home business. Accordingly, there is a need for an improved group control scheme that decreases the complexity of group control of home devices and increases convenience of the group control.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for efficiently grouping a plurality of home devices and controlling the home devices on a group basis in a home network system.

Another aspect of the present disclosure is to provide a method and apparatus for grouping a plurality of home devices according to a preset condition and controlling the home devices on a group basis in a home network system.

Another aspect of the present disclosure is to provide a method and apparatus for controlling home devices on a group basis according to control histories of the home devices in a home network system.

Another aspect of the present disclosure is to provide a method and apparatus for controlling home devices on a group basis according to outdoor information in a home network system.

Another aspect of the present disclosure is to provide a method and apparatus for providing an improved User Interface (UI) to control home devices on a group basis in a home network system.

In accordance with an aspect of the present disclosure, a method for controlling home devices on a group basis in a home network system is provided. The method includes collecting operation state information about a plurality of home devices, generating control history information about the plurality of home devices based on the collected operation state information, receiving a group control command for a group of home devices from among the plurality of home devices, the group of home devices being set based on the control history information, and controlling operations of the group of home devices according to the received group control command.

In accordance with another aspect of the present disclosure, a home gateway for controlling home devices on a group basis in a home network system is provided. The home gateway includes at least one communication module configured to communicate with a plurality of home devices, and a controller configured to collect operation state information about the plurality of home devices, to generate control history information about the plurality of home devices based on the collected operation state information, to control to receive a group control command for a group of home devices from among the plurality of home devices, the group of home devices being set based on the control history information, and to control operations of the group of home devices according to the received group control command.

In accordance with another aspect of the present disclosure, a method for controlling home devices on a group basis in a home network system is provided. The method includes collecting operation state information about a plurality of home devices, receiving a request for executing an operation mode based on current operation states of the plurality of home devices, providing current operation state information about the plurality of home devices in response to the request, receiving a group control command for a group of home devices from among the plurality of home devices, the group of home devices being set based on the current operation state information, and controlling operations of the group of home devices according to the received group control command.

In accordance with another aspect of the present disclosure, a gateway for controlling home devices on a group basis in a home network system is provided. The home gateway includes at least one communication module configured to communicate with a plurality of home devices, and a controller configured to collect operation state information about the plurality of home devices, to control to receive a request for executing an operation mode based on current operation states of the plurality of home devices, to provide current operation state information about the plurality of home devices in response to the request, to control to receive a group control command for a group of home devices from among the plurality of home devices, the group of home devices being set based on the current operation state information, and to control operations of the group of home devices according to the received group control command.

In accordance with another aspect of the present disclosure, a method for controlling home devices on a group basis in a home network system is provided. The method includes requesting group control information used for group control of a plurality of home devices to a home gateway that collects operation state information from the plurality of home devices and controls operations of the plurality of home devices, receiving the group control information from the home gateway, registering group setting information about home devices grouped into a group from among the plurality of home devices, using the group control information, and transmitting a group control command to the home gateway based on the registered group setting information about the group of the home devices.

In accordance with another aspect of the present disclosure, a User Equipment (UE) in a home network system is provided. The UE includes at least one communication module configured to communicate with a home gateway that collects operation state information from a plurality of home devices and controls operations of the plurality of home devices, a user interface configured to control operations of the plurality of home devices, and a controller configured to request group control information used for group control of the plurality of home devices to the home gateway through the user interface, to control to receiving the group control information from the home gateway, to register group setting information about home devices grouped into a group from among the plurality of home devices, using the group control information, and to control to transmit a group command to the home gateway based on the registered group setting information about the group of the home devices.

In accordance with another aspect of the present disclosure, a method for controlling home devices on a group basis in a home network system is provided. The method includes receiving outdoor information related to an outdoor environment change from an external server, acquiring a group control command for a group of home devices based on the outdoor information, and controlling an operation of the group of home devices according to the group control command.

In accordance with another aspect of the present disclosure, a home gateway for controlling home devices on a group basis in a home network system is provided. The home gateway includes at least one communication module configured to communicate with the home devices and an external server, and a controller configured to control to receive outdoor information related to an outdoor environment change from the external server, to acquire a group control command for a group of home devices based on the outdoor information, and to control an operation of the group of home devices according to the group control command.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skilled in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
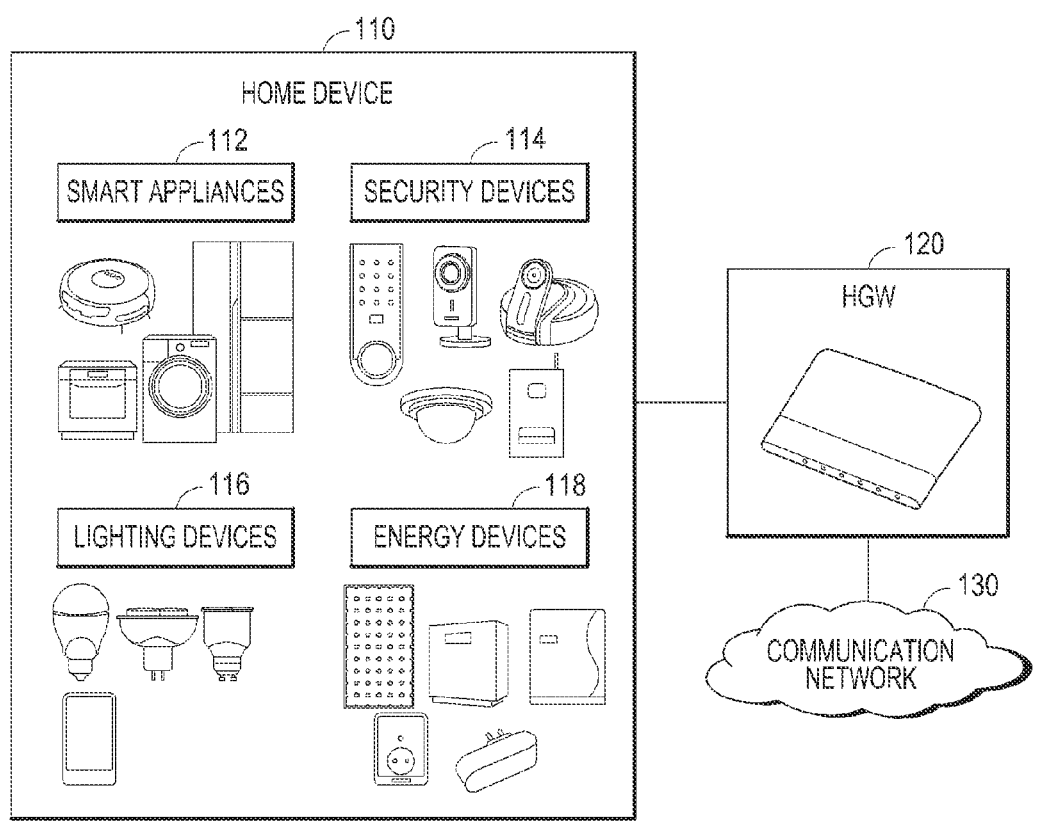
FIG. 1 is a block diagram of a home network system according to an embodiment of the present disclosure.

FIG. 1 is a block diagram of a home network system according to an embodiment of the present disclosure.

Referring to FIG. 1, the home network system includes home devices 110 having control functionality and communication functionality and a Home Gateway (HGW or H-GW) 120. The home devices 100 include smart appliances 112, security devices 114, lighting devices 116, energy devices 118, and the like, which are located in a home. For example, the smart appliances 112 may include a refrigerator, a washing machine, a robot cleaner, and the like. The security devices 114 may include a door lock, a surveillance camera, a security sensor, and the like. The lighting devices 116 may include a fluorescent light, a Light Emitting Diode (LED) light, and the like. The energy devices 118 may include a power meter, a power socket, an electricity outlet, a multi-tab power strip, and the like. Additionally, the home devices 110 may include a Personal Computer (PC), an Internet Protocol (IP) camera, an Internet phone, a wired/wireless phone, an in-house mobile phone, and the like.

The home devices 110 are capable of communicating with the HGW 120 in a wired or wireless communication scheme. The home devices 110 may be configured so as to receive a control command from the HGW 120 and transmit information requested by the control command to the HGW 120. The HGW 120 includes a communication module for communication in the wired or wireless communication scheme. The HGW 120 may include a storage for registering and storing information about the home devices 110 and a controller for collecting information from the home devices 110 and managing the collected information. Particularly, the HGW 120 may allow access from an external communication terminal (for example, a User Equipment (UE) such as a smartphone, a tablet PC, or the like) through a communication network 130 and may transmit a control signal received from the external communication terminal to a home device 110. The communication network 130 includes at least one of an IP network such as the Internet and a wireless network accessible to UEs.

The home network system having the configuration illustrated in FIG. 1 may provide a home entertainment service such as IP TV (IPTV), Video on Demand (VoD), and the like, a home data communication service such as data sharing, Voice over IP (VoIP), and video call, and a home automation service such as remote control of home appliances, remote metering, security, and protection from disaster. In other words, the home network system illustrated in FIG. 1 controls all types of home devices inside or outside a home by interconnecting the home devices to a single network. Accordingly, it may be understood in the present disclosure that the term 'in a home' or 'in-home' covers both inside and outside a home. In addition, it may be understood in the present disclosure that the term 'home' may refer any type of space that a person may occupy, such as an office, a store, a car, a boat, etc.

A user may access the HGW 120 in the home network system or may access each home device 110 through the HGW 120 from a remote place by means of a wireless communication equipment such as a UE. The UE may be any of, for example, a Personal Digital Assistant (PDA), a smartphone, a portable phone, a tablet PC, a laptop computer, and the like, which have communication functionality. The user may access the home network system through an operator network using the UE.

Figure 2:
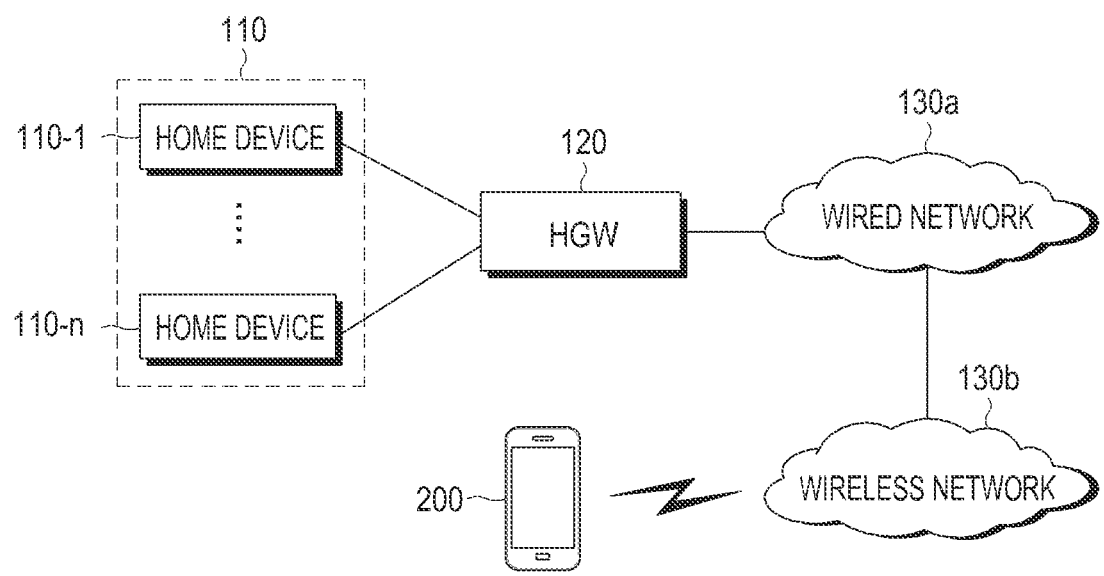
FIG. 2 is a block diagram of a home network system accessible to a User Equipment (UE) according to an embodiment of the present disclosure.

FIG. 2 is a block diagram of a home network system accessible to a UE according to an embodiment of the present disclosure.

Referring to FIG. 2, the home devices 110 (110-1 to 110-$n$) of the home network system are connected to the HGW 120 in a wired or wireless communication scheme. The HGW 120 is connected to a wired network 130$a$ such as the Internet. If the HGW 120 includes a wireless communication module, the HGW 120 may be connected to a wireless network 130$b$.

A registered UE 200 of a user may be connected to the wireless network 130$b$ including a wireless access network and an operator core network and may access the HGW 120 through the wired network 130$a$ or the wireless network 130$b$. The wireless network 130$b$ may be a $2^{nd}$ Generation (2G) or $3^{rd}$ Generation (3G) cellular communication system, a 3rd Generation Partnership Project (3GPP) communication system, a $4^{th}$ Generation (4G) communication system, a Long Term Evolution (LTE) communication system, a World Interoperability for Microwave Access (WiMAX) communication system, or the like. A smart home application is installed in the UE 200 in order to control operations of the home devices 110 connected to the HGW 120 individually or on a group basis.

Upon execution of the smart home application in the UE 200, the UE 200 transmits to the HGW 120 a control command for individually controlling operations of home devices 110 according to a user's key input, touch input, or gesture input, or a group control command for controlling operations of a plurality of grouped home devices 110 by one touch or controlling operations of home devices 110 according to control histories of the home devices 110 (for example, according to operation states of the home devices 110 set by situation, by time, by day, or by room). The HGW 120 transmits a device control command to the home device(s) 110 in order to control the home device 110 or the grouped home devices 110 according to the control command or the group control command. The control command or group control command and the device control command may be configured as a packet including identification information about the home device(s) 110 and control contents. The control contents may include a specific operation control command as well as a power on/off command for the home device(s) 110. The packet carrying the control command or the group control command may include user authentication information about the UE 200. While the control command, the group control command, and the device control command are described separately for the convenience of description, the commands may be configured as the same packet including the identification information about the home device(s) 110 and the control contents.

While it has been described in the embodiment illustrated in FIG. 2 that the UE 200 executes the smart home application and thus transmits the control command or the group control command to the HGW 120 through the network 130a or 130b, it may be further contemplated as another embodiment that the UE 200 transmits the control command or the group control command to the HGW 120 through direct communication with the HGW 120 according to a short-range communication scheme such as Wireless Fidelity (Wi-Fi) without intervention of the network 130a or 130b. In this case, if the UE 200 is not connected to the HGW 120 by Wi-Fi, the HGW 120 may determine that the user is away from the home and if the UE 200 is connected to the HGW 120 by Wi-Fi, the HGW 120 may determine that the user is located in the home. Thus, the HGW 120 may control the operation(s) of the home device(s) 110 differently depending on whether the user is in the home or away from the home.

In another embodiment, the device control command may be transmitted to the home device(s) 110 through a User Interface (UI) provided by the HGW 120 without using the UE 200, in response to the control command or the group control command. In a further embodiment, the HGW 120 may be included in a home device 110 such as a smart TV, a set-top box, a robot cleaner, a refrigerator, a washing machine, a smartphone, an in-house phone, or the like.

Figure 3:
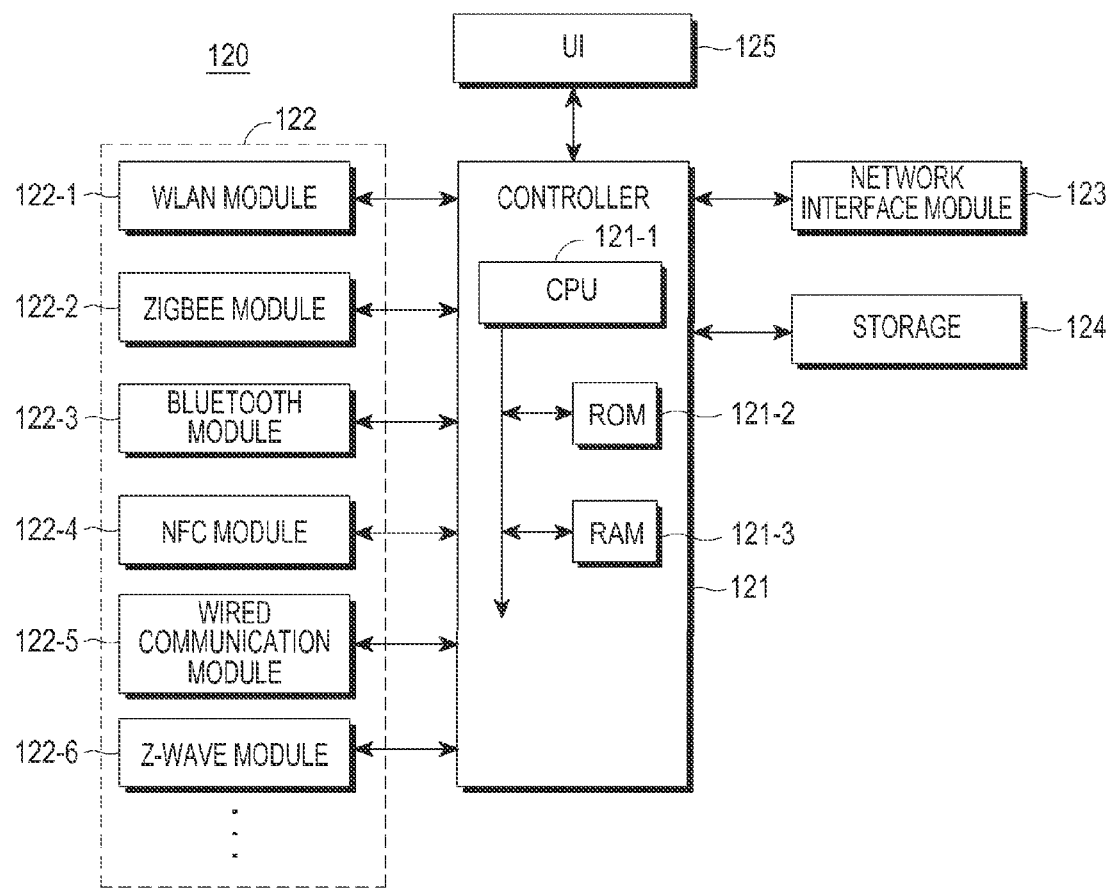
FIG. 3 is a block diagram of a Home Gateway (HGW or H-GW) according to an embodiment of the present disclosure.

FIG. 3 is a block diagram of an HGW according to an embodiment of the present disclosure. The HGW 120 may include at least one of the components illustrated in FIG. 3.

Referring to FIG. 3, the HGW 120 may communicate with the plurality of home devices 110 (110-1 to 110-n) illustrated in FIG. 2 through at least one communication module 122 (122-1 to 122-6) connected to a controller 121. The at least one communication module 122 includes at least one of wired or wireless communication modules such as a Wireless Local Area Network (WLAN) module 122-1 such as a Wi-Fi module, a ZigBee module 122-2, a Bluetooth module 122-3, a Near Field Communication (NFC) module 122-4, a wired communication module 122-5, and a Z-WAVE module 122-6, which conform to wired or wireless communication protocols. The Z-WAVE module 122-6 falls into one of Radio Frequency (RF) technologies which are widely used to control a device, such as home automation.

In FIG. 3, the HGW 120 includes a network interface module 123, a storage 124, and a UI 125. The controller 121 includes a Central Processing Unit (CPU) 121-1, a Read Only Memory (ROM) 121-2 that stores a control program to control the HGW 120, and a Random Access Memory (RAM) 121-3 used as a memory space for tasks performed in the HGW 120. The controller 121 communicates with a home device(s) 110 through the communication module 122 by executing a program stored in the ROM 121-2 or the RAM 121-3 or an application program stored in the storage 124. The controller 121 also transmits to the home device(s) 110 a device control command to the home device(s) 110 to control an operation(s) of the home device(s) 110 individually or on a group basis according to a control command or a group control command received from the UE 200 or the UI 125, or stores information collected from the home device(s) 110 in the storage 124.

The UI 125 includes an output module such as a display, a speaker, a notification lamp and an input module (not shown) such as a touch screen, a keypad, and a microphone. The user may use the UI 125 in order to manipulate the HGW 120 directly, register or delete the home device(s) 110 to or from the HGW 120, or control the operation(s) of the home device(s) 110 through the HGW 120. For this purpose, the HGW 120 may be loaded with the same smart home application as installed in the UE 200. The HGW 120 may install the smart home application in the ROM 121-2 or the storage 124.

In an embodiment of the present disclosure, the home devices 110 may be controlled on a group basis, largely in two modes.

One of the two operation modes is a one-touch mode. In the one-touch mode, upon execution of a one-touch button provided by the smart home application in a determined situation (for example, at a specific time), all or a selected part of home devices 110 operating at the specific time are grouped into the same group and operations of the home devices 110 of the group are controlled. The other operation mode is a control history mode. In the control history mode, home devices 110 operating under a predetermined condition (for example, by situation, by time, by day, or by room) are grouped into the same group and the operations of the home devices 110 of the group are controlled. In the control history mode, the HGW 120 monitors operations of the home devices 110, extracts control histories of the home devices 110, group the home devices 110 matching one or more predetermined conditions based on the extracted control histories, and control the operations of the home devices 110 belonging to the group are controlled. In another embodiment, the HGW 120 may provide the extracted control histories to the user and the home devices 110 may be grouped according to the user's selection.

The network interface module 123 may be, for example, an Internet communication module. The network interface module 123 connects the HGW 120 to an external network in order to connect the HGW 120 to a server operated by an operator of the home network system or a cloud server provided by the home network system. The storage 124 may store program code, data, or information used for operations of the HGW 120 and, when needed, may store data received from an external device or the home device(s) 110, under the control of the controller 121.

Figure 4:
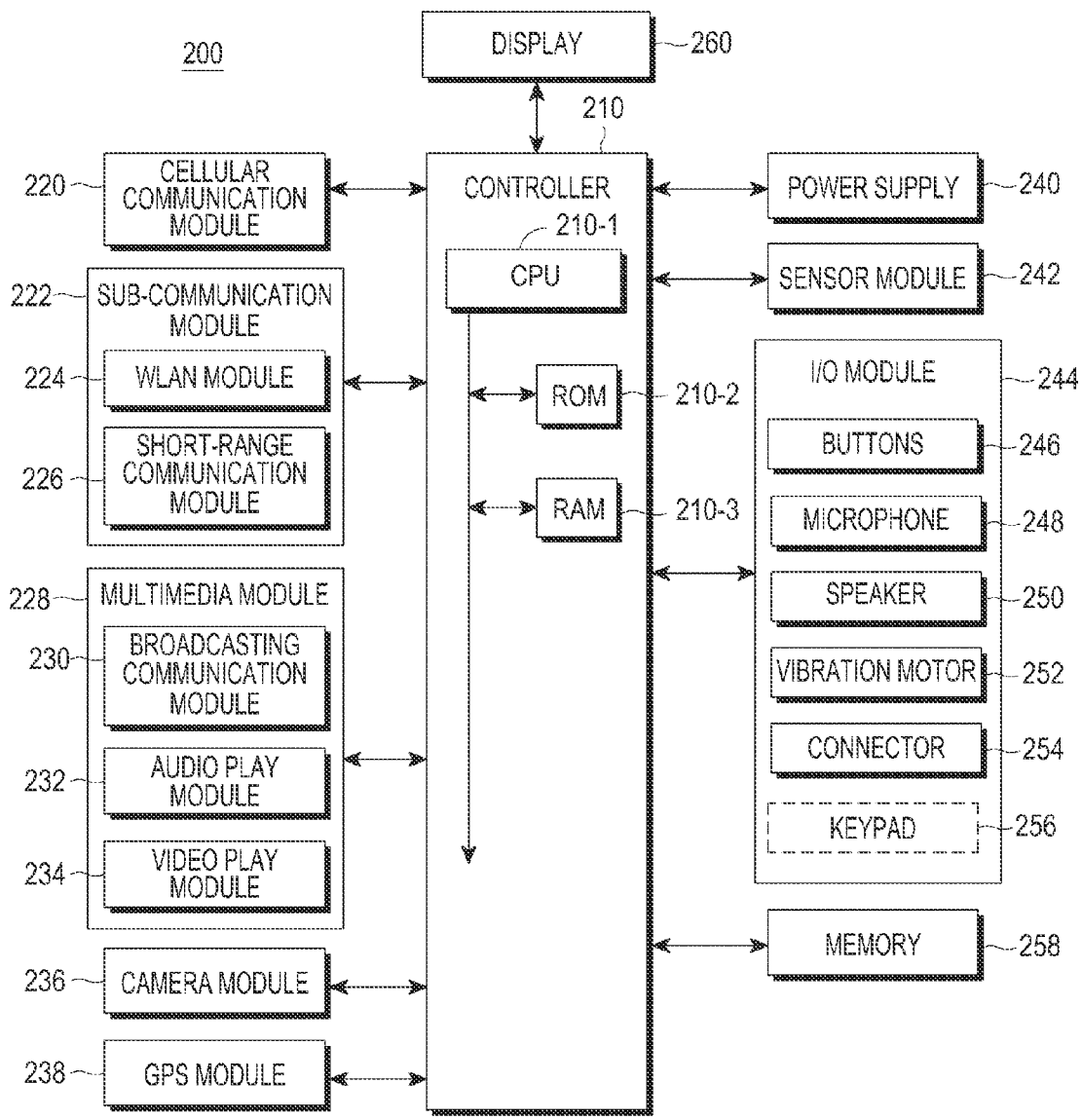
FIG. 4 is a block diagram of a UE according to an embodiment of the present disclosure.

FIG. 4 is a block diagram of a UE according to an embodiment of the present disclosure. The UE may be configured to include at least one of the components illustrated in FIG. 4.

Referring to FIG. 4, the UE 200 includes a controller 210, a cellular communication module 220, a sub-communication module 222, a multimedia module 228, a camera module 236, a Global Positioning System (GPS) module 238, an Input/Output (I/O) module 244 a sensor module 242, a memory 258, a power supply 240, and at least one display 260. The camera module 236 and the GPS module 238 may be optional. The sub-communication module 222 includes at least one of a WLAN module 224 and a short-range communication module 226. While not shown, the sub-communication module 222 may include at least one of modules conforming to wireless communication protocols in the communication module 122 of FIG. 3. The multimedia module 228 includes at least one of a broadcasting communication module 230, an audio play module 232, and a video play module 234. The camera module 236 includes at least one camera, and the I/O module 244 includes at least one of a button set 246, a microphone 248, a speaker 250, a vibration motor 252, a connector 254, and a keypad 256.

The controller 210 includes a CPU 210-1, a ROM 210-2 that stores a control program to control the UE 200, and a RAM 210-3 that temporarily stores an external signal or data or is used as a memory space for tasks performed in the UE 200. The controller 210 controls other components of the UE 200. The cellular communication module 220 connects the UE 200 to an external device (particularly, a Base Station (BS) of a cellular system) by a Radio Access Technology (RAT) conforming to a cellular communication protocol under the control of the controller 220. The cellular communication module 220 transmits and receives a wireless signal carrying a voice call, a video call, a Short Messaging Service (SMS) message, or a Multimedia Messaging Service (MMS) message to and from another communicable device. The cellular communication module 220 may transmit and receive a wireless signal carrying short data in order to control an application or the like.

The WLAN module 224 may be connected to the Internet in a place where a wireless Access Point (AP; not shown) is installed under the control of the controller 210. The short-range communication module 226 may conduct wireless short-range communication between the UE 200 and an external device under the control of the controller 210. The short-range communication may conform to Bluetooth, Zig-Bee, InfraRed Data Association (IRDA), Z-WAVE, or the like. If a communication scheme is mutually supported, the external device may include the HGW 120 or a home device 110. The display 260 may include a touch screen that displays information of various applications (for example, call, data transmission, broadcasting, camera, and the like) including the smart home application executable by the controller 210 and that provides a UI for executing an application. The controller 210 may control selection of a soft key displayed on the touch screen or may execute a related function in response to a user gesture sensed on the touch screen. The user gesture includes a touch made by a finger or a tool or a motion made by a human body.

If the smart home application described above with reference to FIG. 2 is installed in the ROM 210-2 or the memory 258 and then executed, the UE 200 provides a UI screen for grouping the home devices 110 according to a user's key input, touch input, or gesture input sensed by an acceleration sensor or a gyro sensor, generates a group control command for controlling operations of related home devices 110 on a group basis in the one-touch mode or the control history mode, and transmits the group control command to the HGW 120. The group control command may be transmitted to the HGW 120 through the communication network 130 or by a communication scheme such as power line communication, Wi-Fi, ZigBee, Z-WAVE, or the like. The memory 258 stores various applications, content, and data used to use the UE 200, and operation state information about the home devices 110, operation state information processing results, group setting information about the home devices 110, and control history information about the home devices 110, which are received from the HGW 120, for group control according to the present disclosure.

In the embodiment illustrated FIG. 2, after each home device 110 performs an operation according to a device control command, the home device 110 feeds back information indicating the operation result to the HGW 120. Then the HGW 120 transmits information indicating the operation result (hereinafter, referred to processing result information) to the UE 200 and the smart home application of the UE 200 provides a UI that indicates the processing result. The UI may be provided in various forms including a sound effect, a voice message, a text message, an icon, an animation, and the like.

If the user is away from the home, the user may monitor an in-home situation of the home devices 110 through the UE 200. In this case, the user may access the HGW 120 through the UE 200 and monitor the in-home situation by controlling at least one of registered home devices 110 through the HGW 120. For this operation, at least one of the home devices 110 may include a digital camera for capturing a still image or video of an in-home situation. While it has been described in the foregoing embodiment that a (group) control command of the user for controlling the home devices 110 is transmitted to the HGW 120 through the UE 200, the UE 200 may use various smart devices in which the smart home application may be installed, for example, a tablet PC, an IP-based wired/wireless phone, a multi-functional remote control, a smart TV, and the like. The smart home application may be provided as a Widget or the like. In this case, an operation state of a home device 110 may be displayed in real time, periodically or upon request.

Figure 5:
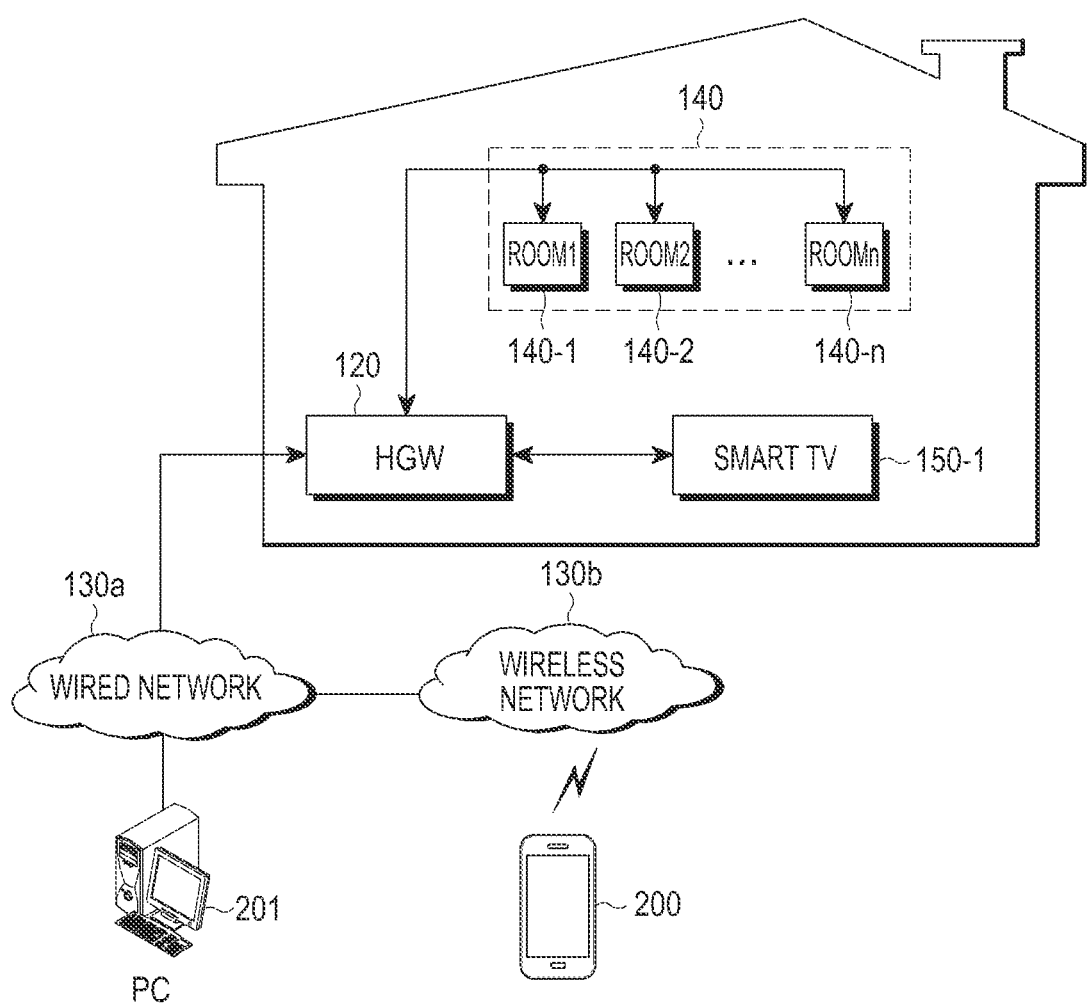
FIG. 5 is a block diagram of a home network system supporting group control of home devices according to an embodiment of the present disclosure.

FIG. 5 is a block diagram of a home network system supporting group control of home devices according to an embodiment of the present disclosure. A detailed description of the same components described before with reference to FIGS. 1 to 4 will not be provided herein.

In the embodiment illustrated in FIG. 5, the HGW 120 registers information about the home devices 110, groups the home devices 110 in the one-touch mode or the control history mode, and stores and manages group setting information. Upon receipt of a group control command through the smart home application, the HGW 120 uniformly controls operations (e.g., on/off operations) of home devices 110 belonging to a group corresponding to the group control command. The locations of the home devices 110 are registered by room. In FIG. 5, reference numerals 140-1, and 140-2 to 140-*n*, denote at least one room 140 in which at least one home device 110 is located/installed and the HGW 120 may control an operation(s) of a home device(s) 110 by room. The HGW 120 is connected to a wired network 130*a* such as the Internet. If the HGW 120 includes a wireless communication module, the HGW 120 may be connected to a wireless network 130*b*. The HGW 120 provides the UE 200 (or the specific device such as a PC 201 or the smart TV 150-1) with information used for group control (referred to as group control information) (for example, group setting information, control history information, and operation state information about the home devices 110, and the like) by communicating with the UE 200 such as a smartphone, a tablet PC, or the like (or a specific home device such as a smart TV 150-1). The group setting information includes registration information about the home devices 110 to be controlled by group, which has been set through the UE 200. If the group setting information is registered through the UE 200, the UE 200 transmits the group setting information to the HGW 120. If the group setting information is updated, the UE 200 also transmits the updated group setting information to the HGW 120. Therefore, the HGW 120 and the UE 200 may share the same group setting information. Alternatively, the HGW 120 may automatically configure and register group setting information based on the control history information. The group setting information configured by the HGW 120 is transmitted to the UE 200. Upon receipt of the group setting information registered through the UE 200, the HGW 120 re-transmits the received group setting information to the UE 200 when it performs group control, so that the UE 200 may determine whether the received group setting information is identical to the pre-stored group setting information. If the group setting information is different, the UE 200 may transmit group setting information confirmed (or reconfigured) by the UE 200 to the HGW 120. The group setting information may be registered and shared in any other similar and/or suitable manner.

The home devices 110 transmit to the HGW 120 their operation state information at a current time or their operation state information accumulated from a previous transmission time of operation state information to the current time, at every predetermined period or upon receipt of an operation state information request from the HGW 120. The HGW 120 may collect the operation state information from the home devices 120 according to preset conditions. The conditions may be set by situation, by time, by day, or by room. For example, conditions by situation may include various situations in which the operation states of the home devices 110 may be distinguished in the home, for example, going-out, back-home, movie-watching, study, sleep, wake-up, vacation, cleaning, eating, and the like. Herein, a plurality of conditions may be set together. The HGW 120 may generate control history information about one or more home devices 110 that satisfy one or more conditions and provide the control history information to the UE 200.

In an embodiment of the present disclosure, the home devices 110 may be grouped by providing a list of home devices 110 operating at a current time or a specific time to the UE 200 and receiving the user's confirmation, for group control in the one-touch mode. For group control in the control history mode, the HGW 120 may automatically group the home devices 110 based on control history information about the home devices 110 monitored by the HGW 120. Alternatively, after providing the control history information to the UE 200, the HGW 120 may group one or more home devices 110 selected by the user through the smart home application into the same group. If the UE 200 is not used, the home devices 110 may be grouped in the same manner through a UI provided by the HGW 120.

For grouping of the home devices 110, the home devices 110 should be registered. The registration may be performed by room 140. For example, the current locations of the home devices 110 may be registered directly to the HGW 120 or detected using a Radio Frequency (RF) tag, a sensor, or the like provided in each home device 110. Location information about the home devices 110 is mapped to the names of rooms in which the home devices 110 are located. For example, location information about a refrigerator and a TV may be mapped to the names of rooms in which the refrigerator and the TV are located, such as a kitchen and a living room. The location information about the home devices 110 may have locations in which the home devices 110 are generally installed as default values. The location of a home device 110 may be changed by dragging and dropping an icon representing the home device 110 from one room to another room, applying a gesture input such as a touch, or generating a voice command on a home plan view provided through the UE 200 or the smart TV 150-1. The UE 200 or the smart TV 150-1 may receive location information about the home devices 110 expressed as the names of rooms and plan view information reflecting the room location information from the HGW 120 and may provide a UI that displays operation state information about the home devices 110 by the whole home, by room, or by device. The UE 200 or the smart TV 150-1 may provide a UI that receives the control history information and group setting information about the home devices 110 from the HGW 120 and displays the received information.

Figure 6:
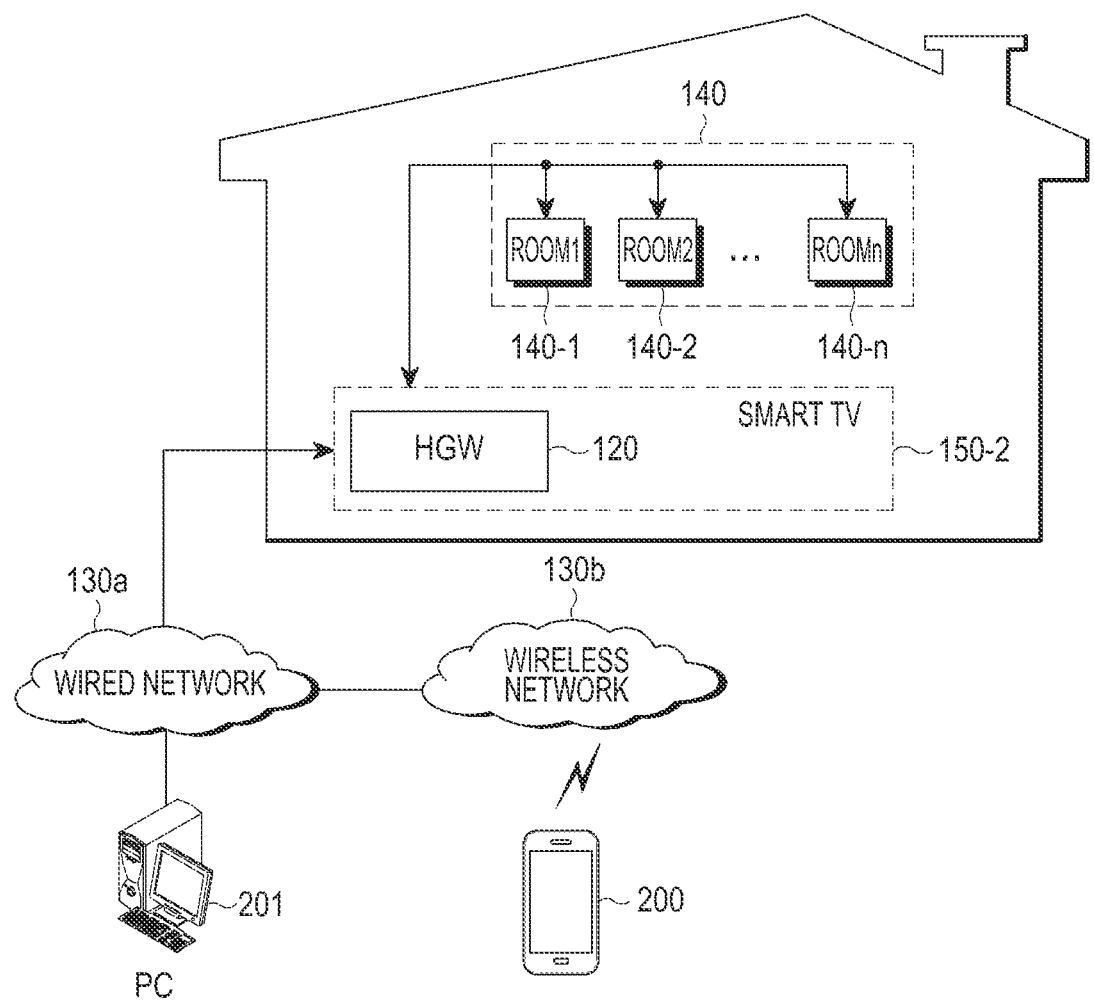
FIG. 6 is a block diagram of a home network system supporting group control of home devices according to another embodiment of the present disclosure.

FIG. 6 is a block diagram of a home network system supporting group control of home devices according to another embodiment of the present disclosure.

In the home network system illustrated in FIG. 6, the HGW 120 is mounted in a smart TV 150-2 that facilitates installation of a smart home application and provision of a Graphical User Interface (GUI), among the home devices. In this case, the user may group the home devices 110 for group control of the home devices 110 and view group control information (for example, group setting information, control history information, and operation state information about the home devices 110, and the like) more conveniently on a relatively large screen provided by the smart TV 150-2.

In the home network system illustrated in FIG. 6, the HGW 120 registers information about the home devices 110 installed in the home and controls and manages the registered home devices 110. For example, if a new home device is installed, the HGW 120 collects and stores information about the new home device, for example, an Identifier (ID), capacity information, and operation state information about the new home device. The HGW 120 may acquire the information about the home device directly from the home device by a service discovery procedure between the HGW 120 and the home device, from a server on the Internet, directly from the user, or from a system administrator. When the user purchases and installs a new home device and inputs identification information provided by the home device or its use manual, for example, a serial number, a model number, or a Quick Response (QR) code to the HGW 120, the HGW 120 accesses a manufacturer server on the Internet and acquire the information about the home device based on the identification information about the home device. The HGW 120 is connected to a wired network 130a such as the Internet. If the HGW 120 includes a wireless communication module, the HGW 120 may be connected to a wireless network 130b. A PC 201 communicates via the wired network 130a and a UE 200 communicates via the wireless network 130b.

Figure 7:
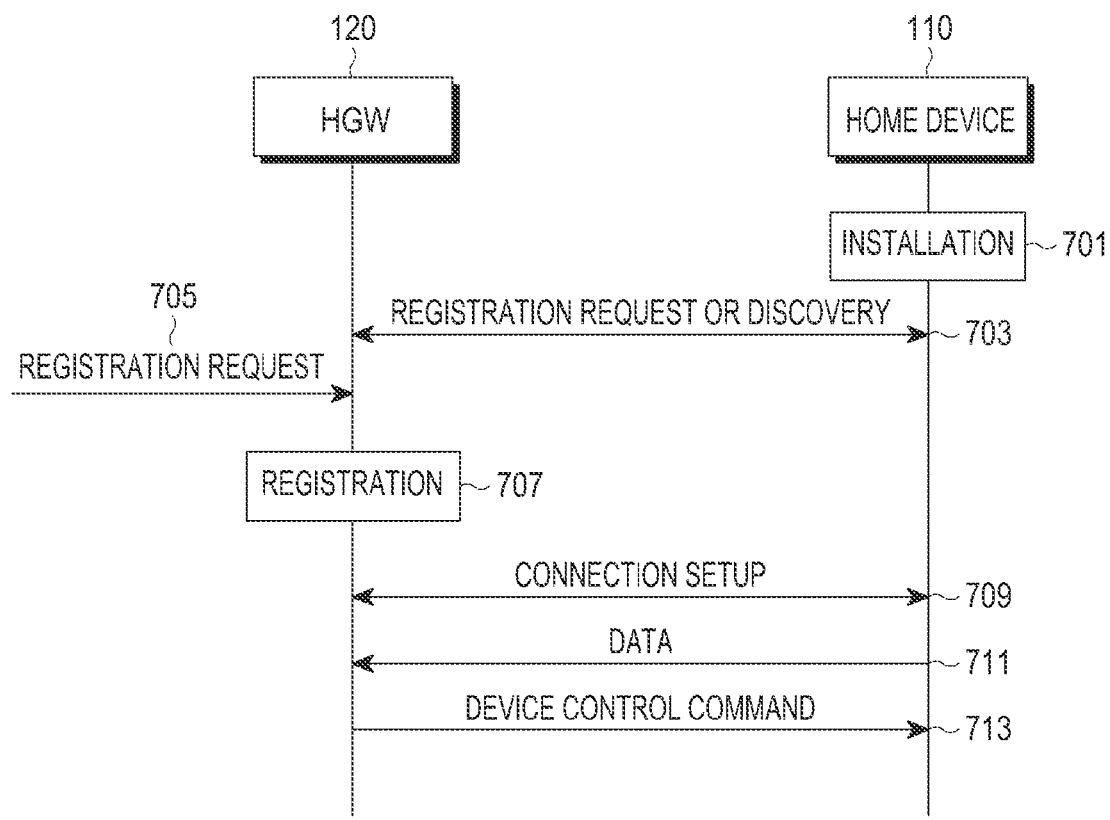
FIG. 7 is a diagram illustrating a signal flow for a procedure for registering a home device according to an embodiment of the present disclosure.

FIG. 7 is a diagram illustrating a signal flow for a procedure for registering a home device according to an embodiment of the present disclosure.

Referring to FIG. 7, when a new home device 110 is installed and power is supplied to the home device 110, a procedure for registering the home device 110 to the HGW 120 starts in operation 701. Alternatively, a procedure for registering an existing home device 110 to the HGW 120 starts. Once the registration procedure starts, the HGW 120 performs a discovery procedure for the home device 110 in operation 703. For example, if the home device 110 is connected to the HGW 120 by Wi-Fi, the HGW 120 performs the discovery procedure for a new neighboring home device periodically or upon user request. The HGW 120 receives information (hereinafter, referred to as home device information) about the home device 110 detected by the discovery procedure from the home device 110. The home device information includes identification information and capacity information about the home device 110. In a selective embodiment, the identification information may include a product code indicating the product type of the home device 110 (for example, air conditioner, refrigerator, LED light, or the like).

In a selective embodiment, the HGW 120 receives a registration request for the home device 110 through a UI of the HGW 120, a control console connected to an external interface, or a computer connected to the Internet and receives information about the home device 110 from the user in operation 705. In another embodiment, the HGW 120 may acquire identification information about the home device 110 from the home device 110 or the user, access a manufacturer server of the home device 110 based on the identification information about the home device 110, and acquire capacity information about the home device 110 from the manufacturer server.

In operation 707, the HGW 120 registers and stores the home device information about the home device 110. In a selective embodiment, the HGW 120 may receive additional information about the home device 110 directly from the user, or from the UE 200 through the Internet or by Wi-Fi. The additional information may include at least one of a name, a nickname, and an installation location of the home device 110.

In a selective embodiment, the HGW 120 may receive additional information about an operation mode and/or authorization of the home device 110 directly from the user, or from the UE 200 through the Internet or Wi-Fi. The additional information specifies, for example, an access authorization level of the home device 110. Access authorization levels may include, for example, access only through the HGW 120, access from the registered UE 200, and access from a remote terminal registered to the HGW 120.

In operation 709, the HGW 120 establishes a connection to the home device 110. The connection is established according to a predetermined procedure conforming to Wi-Fi, ZigBee, Bluetooth, NFC, or Z-WAVE, or a wired communication scheme depending on a communication scheme between the HGW 120 and the home device 110. When the connection is established between the HGW 120 and the home device 110, the home device 110 may transmit data to the HGW 120 through the connection in operation 711. In an embodiment, the home device 110 may transmit its operation state information periodically or upon request of the HGW 120.

In operation 713, the HGW 120 may transmit a device control command to the home device 110. For example, the HGW 120 may transmit a device control command for power on/off to a plurality of home devices 110 grouped into the same group simultaneously or in a predetermined order (or in a predetermined time order) according to group control in the embodiment of the present disclosure. The device control command may include a specific control command that sets/restricts an operation time or a power use amount. The same or different device control commands may be transmitted to the home devices 110 of the same group.

Figure 8:
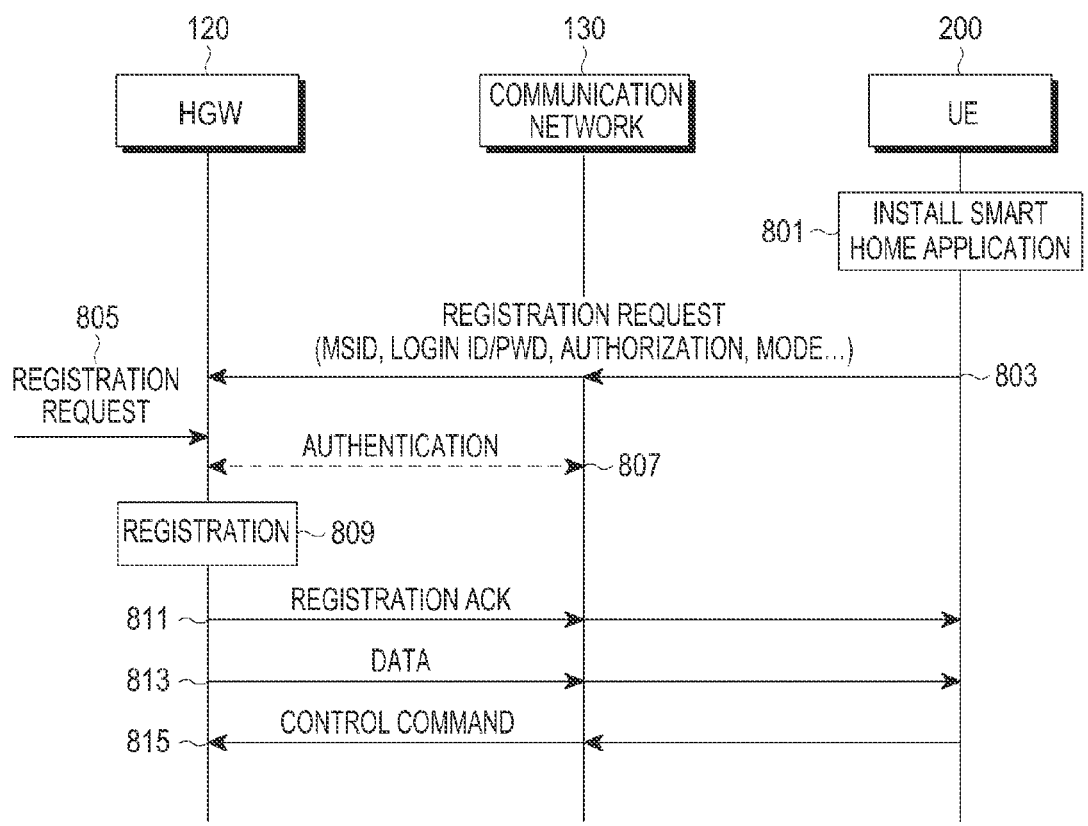
FIG. 8 is a diagram illustrating a signal flow for a procedure for registering a UE according to an embodiment of the present disclosure.

FIG. 8 is a diagram illustrating a signal flow for a procedure for registering a UE according to an embodiment of the present disclosure.

Referring to FIG. 8, the UE 200 installs a smart home application supporting remote control of the HGW 120 in operation 801. In a selective embodiment, installation of the smart home application may be limited to the UE 200 that has been authenticated by a predetermined authentication procedure. For example, the HGW 120 provides an authentication number and a manufacture server that manages the HGW 120 or an external server that provides the smart home application may allow only the UE authenticated by the authentication number to download the smart home application.

In a selective embodiment, the smart home application may provide limited functions according to an authorization level assigned to the UE 200. For example, the smart home application may selectively provide at least one of the functions of information search through the HGW 120, alarm information reception from the HGW 120, grouping of the home devices 110, and partial control or full control of the home devices 110 according to the authorization level of the UE 200. The authorization level may be set through the HGW 120, the manufacturer server that manages the HGW 120, or the external server that provides the smart home application.

In operation 803, the UE 200 executes the smart home application and transmits a registration request message to the HGW 120 through the smart home application. The smart home application may be transmitted to the HGW 120 through the Internet or the smart TV 150-2, or directly by Wi-Fi. The registration request message includes at least one of an ID of the UE (for example, MS Identifier (MSID) or International Mobile Subscriber Identity (IMSI)), a login ID and a password, authorization information, and operation mode information.

In a selective embodiment, the HGW 120 receives in operation 805 the registration request for the UE 200 to be registered from the user through a UI of the HGW 120, a control console connected to an external interface, or a computer on the Internet. The HGW 120 may receive information about the UE 200, for example, authorization information and/or operation mode information (for example, the one-touch mode, the control history mode, or the like) from the user. In a selective embodiment, the HGW 120 may in operation 809 authenticate the UE 200 using identification information acquired from the UE 200 or by accessing a server managing subscriber information of a mobile communication system, if the UE 200 is a smartphone. If the authorization information about the UE has not been input to the HGW 120, the HGW 120 may generate authorization information about the UE 200 based on the authentication result.

The HGW 120 stores the information about the UE 200 and manages the UE 200 as registered in operation 809. In operation 811, the HGW 120 transmits a registration ACKnowledgment (ACK) message to the UE 200, indicating successful registration of the information about the UE 200. Then the HGW 120 may transmit group control information used to control the home devices 110 on a group basis to the UE 200 in operation 813. The group control information includes at least one of group setting information, control history information, and operation state information about the home devices 110.

In operation 815, upon receipt of the group control information, the user of the UE 200 may transmit a group control command to the HGW 120, for group control in the one-touch mode or the control history mode using a UI provided by the smart home application. Upon receipt of the group control command, the HGW 120 transmits a device control command to one or more home devices 110 of a corresponding group to control operations of the home devices 110. In a selective embodiment, even though the HGW 120 has not received a group control command from the UE 200, for example, if a condition set for the history control mode is satisfied, the HGW 120 may transmit alarm information indicating that the condition is satisfied to the UE 200. Upon receipt of an ACK signal from the UE or even though the ACK signal is not received from the UE, the HGW 120 may control the operations of the one or more home devices 110 of the group.

Now, a detailed description will be given of operation modes for group control according to embodiments of the present disclosure.

To generate a group control command conventionally, a user should define situations triggering grouping of home devices, select home devices for each group one by one, and set operation states to be controlled. As a result, as more home devices are grouped, time and complexity involved in a group control are increased.

To mitigate the inconvenience, an embodiment of the present disclosure provides a group control method for monitoring operation states of home devices, grouping highly correlated home devices into the same group based on the control histories of the home devices under a predetermined condition, and controlling the group of home devices by an HGW.

In the embodiment of the present disclosure, the HGW monitors operation states of home devices connected to the HGW and checks the control histories of the home devices. Further, the HGW 120 sets or determines correlations between the home devices according to a predetermined condition, for example, by situation, by time, by day, or by room.

The HGW stores and manages the control histories of the home devices internally or in an external server. When the home devices are grouped, the HGW provides information about the control histories to its UI, a UE, or a home device such as a smart TV equipped with the HGW. The control histories of the home devices may be provided by situation, by time, by day, or by room. If a plurality of users have been registered, the control histories of the home devices may be provided to the individual users.

If home devices operating at a specific time (for example, at a current time) are grouped into one group by one touch, the HGW may control on/off of the home devices of the group at one time by executing the one-touch mode of the smart home application, without the need for the user's grouping of the home devices one by one.

The home devices grouped into the same group are controlled on a group basis simultaneously or in a predetermined order (or in a predetermined time order). A group control command for group control may be provided to the HGW by a UE, input through a UI of the HGW, or input through a home device equipped with the HGW. In another embodiment, each individual home device may directly recognize the group control command, determine whether the home device belongs to a corresponding group or satisfies a predetermined condition, and determine whether to operate based on the determination. In this case, the group control command may include at least one of, for example, a group ID, a condition ID, and a device control command for controlling a specific operation (for example, on/off control, operation time control, power use amount control, and the like).

In other words, upon direct or indirect receipt (or input) of a group control command, the HGW may determine home devices of a corresponding group and transmit the group control command to the home devices of the corresponding group in a home. In another embodiment, if the HGW may transmit the group control command to all home devices in a home, each of the home devices receiving the group control command may determine whether the home device belongs to the group or satisfies a predetermined condition and determines whether to operate based on the determination in the embodiment of the present disclosure.

Figure 9:
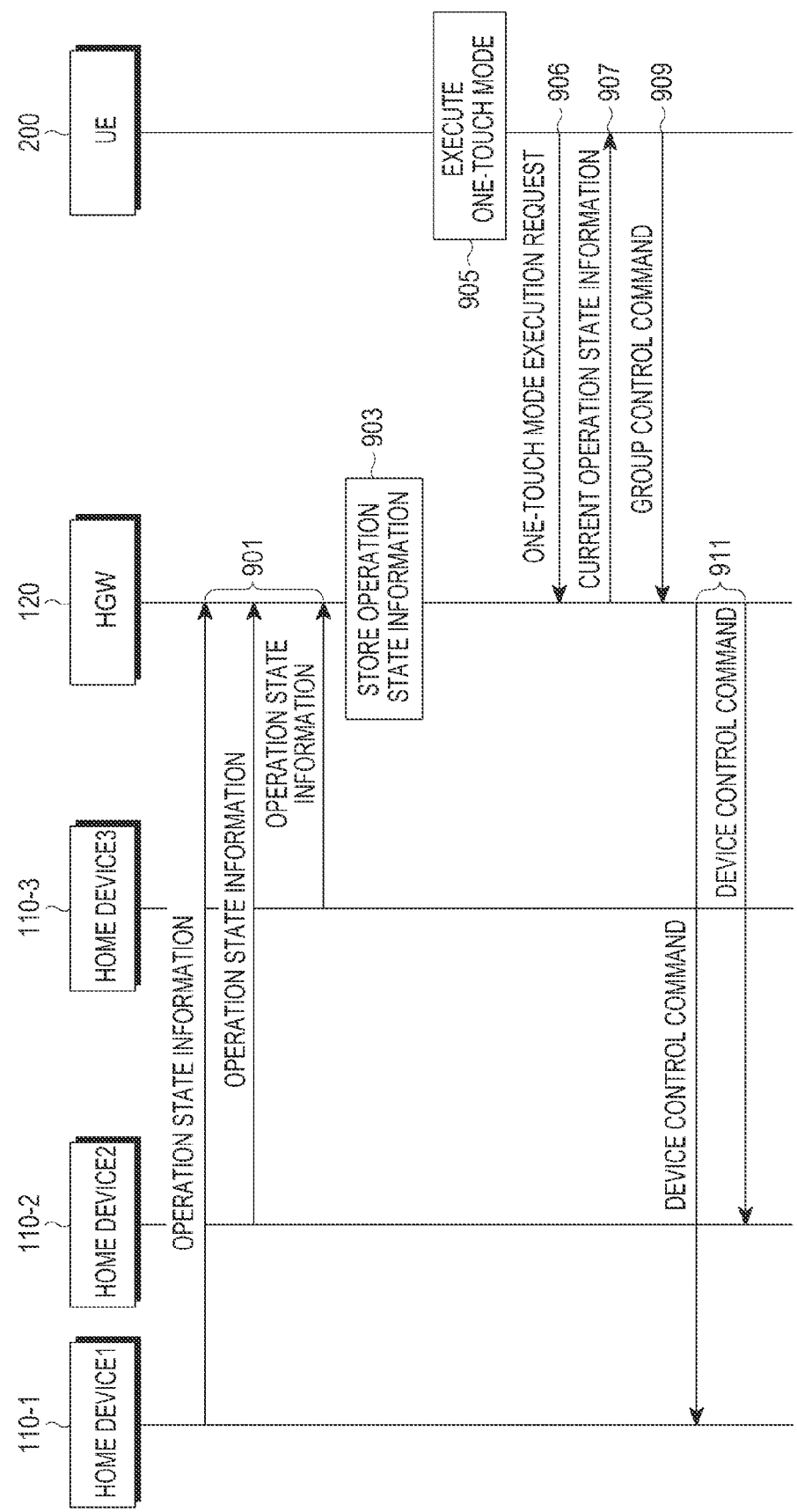
FIG. 9 is a diagram illustrating a signal flow for a group control method in a one-touch mode in a home network system according to an embodiment of the present disclosure.

FIG. 9 is a diagram illustrating a signal flow for a group control method in a one-touch mode in a home network system according to an embodiment of the present disclosure. The embodiment of FIG. 9 is based on a group control command provided through the UE 200. For the convenience of description, it is assumed that all home devices are a first home device (home device 1) 110-1, a second home device (home device 2) 110-2, and a third home device (home device 3) 110-3.

Referring to FIG. 9, the HGW 120 receives operation state information from all of the home devices 110-1, 110-2, and 110-3 periodically or upon request in operation 901 and stores the operation state information in relation to the respective home devices in operation 903. If the smart home application of the UE 200 is executed and the one-touch mode is executed (execution of the one-touch mode may be interpreted as a mode of setting the one-touch mode) in operation 905, the UE 200 transmits a one-touch mode execution request to the HGW 120 in operation 906. Upon receipt of the one-touch mode execution request, the HGW 120 replies to the UE 200 by transmitting the operation state information about the home devices 110-1, 110-2, and 110-3 for a current time to the UE 200 in operation 907. When the one-touch mode is initially executed, a UI screen may be provided as illustrated in FIG. 10 or 11.

Figure 10:
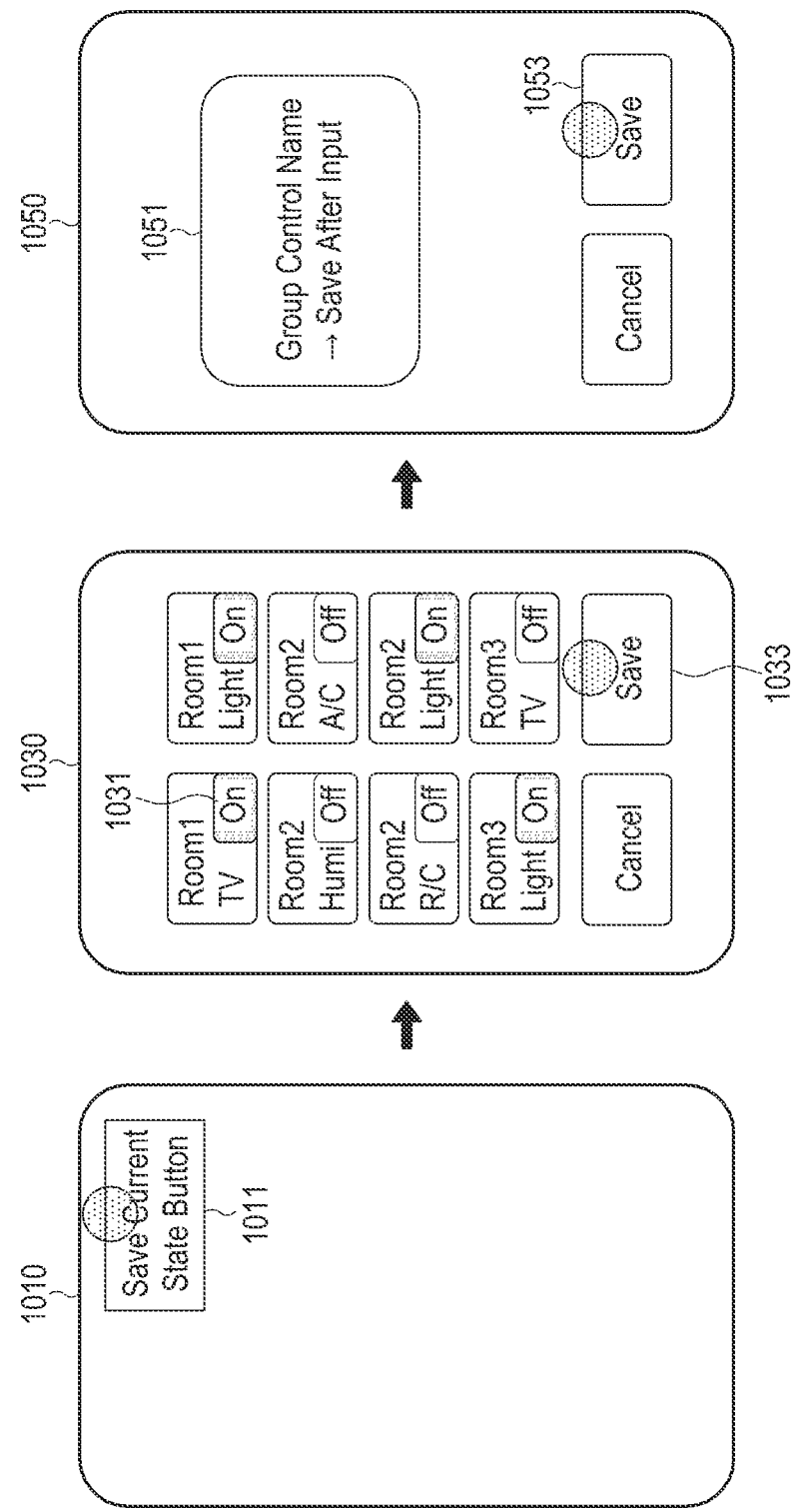
FIGS. 10 and 11 illustrate User Interface (UI) screens provided in the one-touch mode in a home network system according to an embodiment of the present disclosure.

FIG. 10 illustrates UI screens in a one-touch mode in which in-home zones are not defined according to an embodiment of the present disclosure.

Referring to FIG. 10, when the user clicks a Save Current State button 1011 on a UI screen of the UE 200 as indicated by reference numeral 1010, the smart home application displays the operation states of the home devices 110-1, 110-2, and 110-3 as on or off as indicated by reference numeral 1031 based on the operation state information about the home devices 110-1, 110-2, and 110-3 at the current time, as indicated by reference numeral 1030. The user may store the operation states of the home devices 110-1, 110-2, and 110-3 for the current time without any change or after changing the operation state of a home device from an on-state to an off-state or vice versa, as indicated by reference numeral 1033. The stored operation states of the home devices 110-1, 110-2, and 110-3 may be registered and stored as indicated by reference numeral 1051 in the one-touch mode under an input group control name as indicated by reference numerals 1050 and 1053. The UE 200 transmits the stored one touch-mode group setting information to the HGW 120. If the one-touch mode stored under the group control name is executed, the UE 200 transmits a group control command based on the group setting information to the HGW 120.

Figure 11:
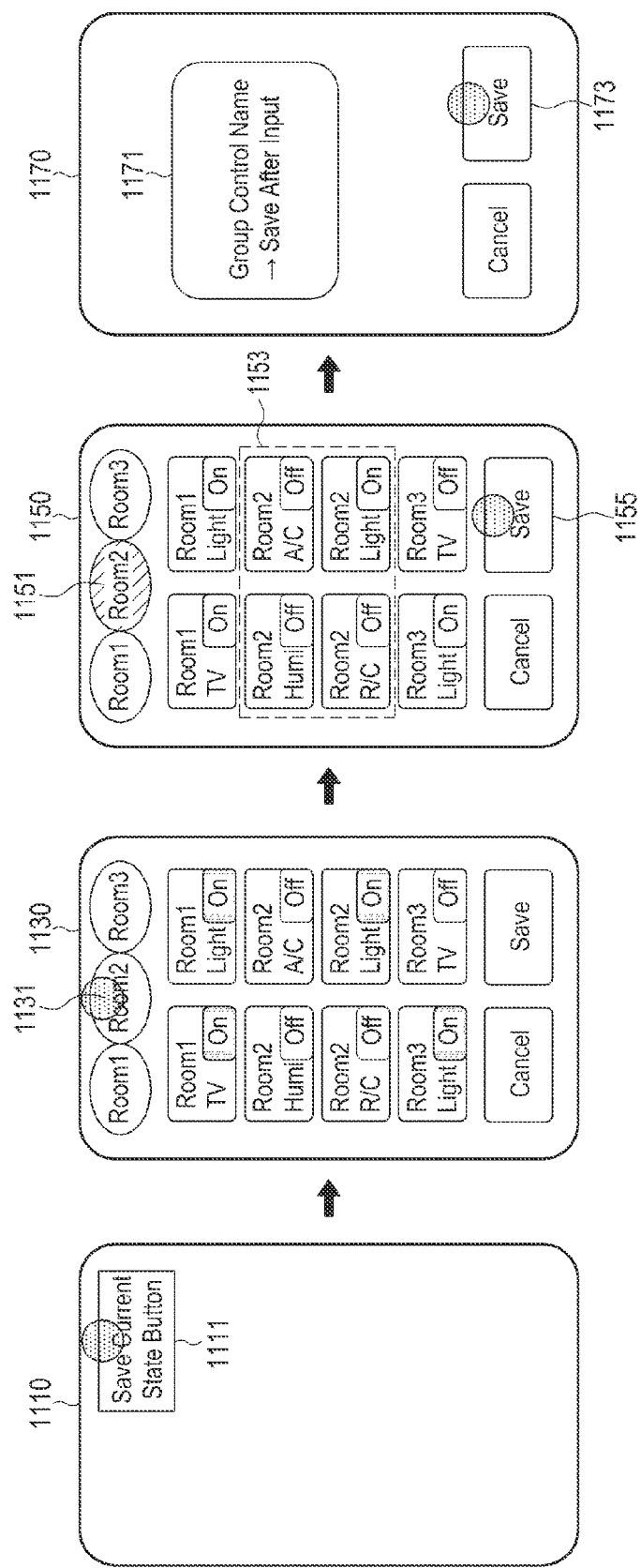

FIG. 11 illustrates UI screens in a one-touch mode in which in-home zones are defined by room according to an embodiment of the present disclosure.

Referring to FIG. 11, when the user clicks a Save Current State button 1111 on a UI screen of the UE 200 as indicated by reference numeral 1110, the smart home application displays the operation states of the home devices 110-1, 110-2, and 110-3 as on or off by room 1131 based on the operation state information about the home devices 110-1, 110-2, and 110-3 at the current time, as indicated by reference numeral 1130. The user may store 1155 the operation states of the home devices 110-1, 110-2, and 110-3 for the current time by room 1151 and 1153 without any change or after changing the operation state of a home device from an on-state to an off-state or vice versa, as indicated by reference numeral 1150. The stored operation states of the home devices 110-1, 110-2, and 110-3 may be registered and stored as indicated by reference numeral 1171 in the one-touch mode under an input group control name, as indicated by reference numerals 1170 and 1173. The UE transmits the stored one touch-mode group setting information to the HGW 120. If the one-touch mode stored under the group control name is executed, the UE 200 transmits a group control command based on the group setting information to the HGW 120.

Referring to FIG. 9 again, upon receipt of a group control command configure or stored as illustrated in the embodiment of FIG. 10 or 11 in operation 909, the HGW 120 transmits a device control command to the home devices 110-1 and 110-2 of a group corresponding to the group control command in operation 911. If the group control command is stored in the embodiment of FIG. 9, the user may retrieve the group control command from the UE 200 and transmit the group control command to the HGW 120, to thereby control operations of the home devices 110-1 and 110-2.

According to the embodiment illustrated in FIGS. 9, 10 and 11, a function button for facilitating storing and editing of settings for a group control of home devices based on the operation states of the home devices at a current time may be provided. Accordingly, the user may generate and store a group control command reflecting the operation states of the home devices corresponding to a current situation by one click. In addition, when a group control command is initially set, the user may be relieved of the constraint imposed by the number of situations (for example, eating, study, movie-watching, and the like)/the number of home devices. When the operation states of home devices at a current time are stored, the user may modify/edit zone information and state information about the home devices.

In another embodiment, control histories of home devices may be stored and used even in a one-touch mode, while not shown in the embodiment illustrated in FIGS. 9, 10, and 11. In this case, the control histories of the home devices may be stored along with detailed operation states of the home devices. When the one-touch mode is set, the on/off states of the home devices at a current time may be set and the frequently used operation states of the home devices may be set as their detailed operation states based on the control histories. For example, if an air conditioner being a home device is currently in the on state when the one-touch mode is set, the air conditioner may be set as the on state and detailed operation states of the air conditioner, such as frequently used wind strength, temperature, and the like may also be set based on the control history of the air conditioner until the moment. The user may directly set the detailed operation states of the air condition through a UI.

Figure 12:
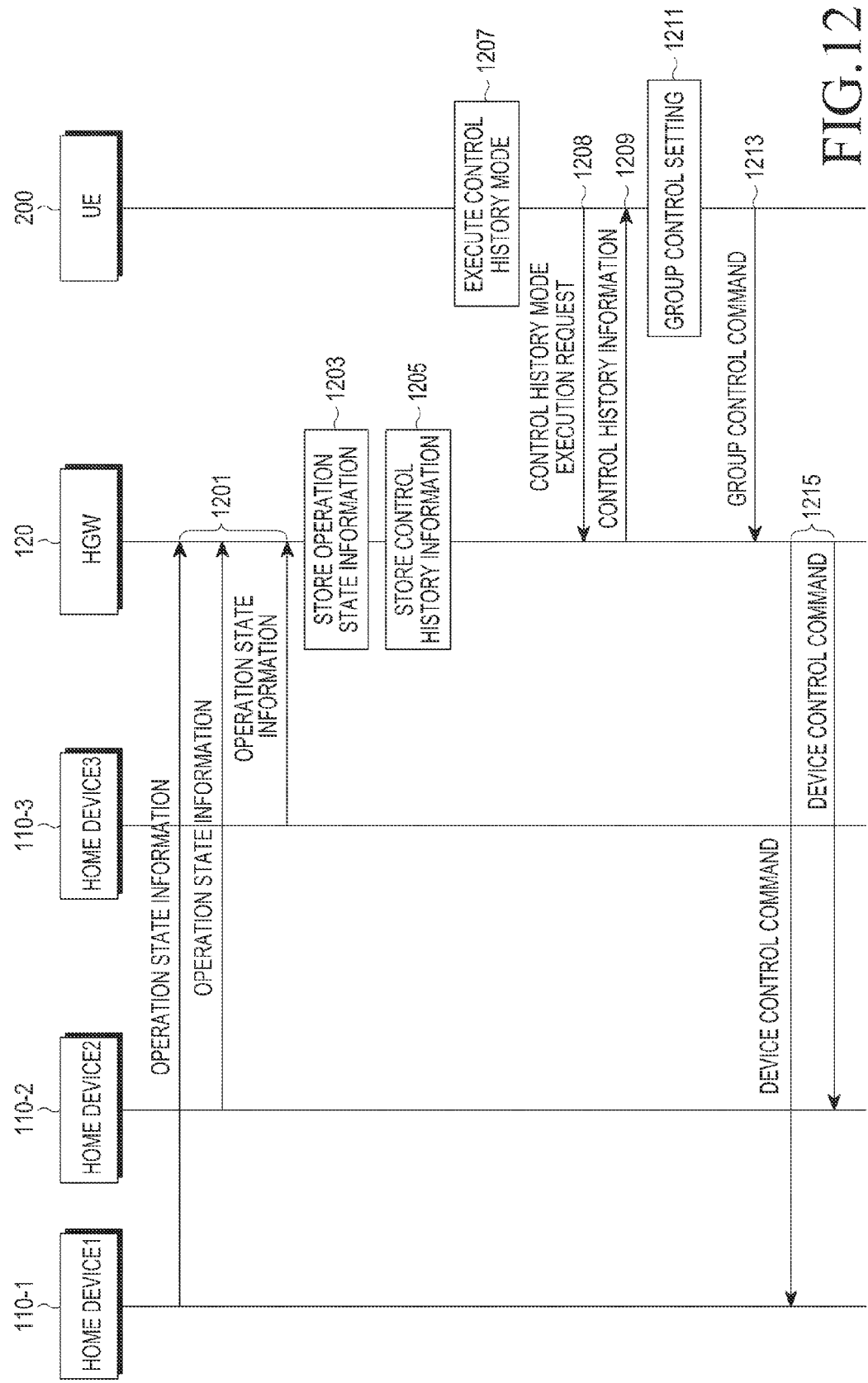
FIG. 12 is a diagram illustrating a signal flow for a group control method in a control history mode in a home network system according to an embodiment of the present disclosure.

FIG. 12 is a diagram illustrating a signal flow for a group control method in a control history mode in a home network system according to an embodiment of the present disclosure. The embodiment of FIG. 12 is based on the assumption that a group control command is transmitted through the UE 200. For the convenience of description, it is assumed that all home devices are home device 1 110-1, home device 2 110-2, and home device 3 110-3.

Referring to FIG. 12, the HGW 120 receives operation state information from all of the home devices 110-1, 110-2, and 110-3 periodically or upon request in operation 1201 and stores the operation state information in relation to the respective home devices 110-1, 110-2, and 110-3 in operation 1203. In operation 1205, the HGW 120 monitors control histories of the home devices 110-1, 110-2, and 110-3 based on the accumulated operation state information about the home devices 110-1, 110-2, and 110-3 periodically or upon request and stores the control histories. If the smart home application of the UE 200 and the control history mode are executed in operation 1207, the UE 200 transmits a control history mode execution request to the HGW 120 in operation 1208. Upon receipt of the control history mode execution request, the HGW 120 replies to the UE 200 by transmitting control history information about the home devices 110-1, 110-2, and 110-3 to the UE 200 in operation 1209. When the control history mode is initially executed, UI screens may be provided as illustrated in FIGS. 13 to 17. The accumulated operation state information about the home devices 110-1, 110-2, and 110-3 may be provided as the control history information or detailed history information may be generated based on correlations between the home devices 110-1, 110-2, and 110-3 according to a predetermined condition, for example, by situation, by time, by day, or by room.

In operation 1211, the home devices 110-1, 110-2, and 110-3 are grouped based on their history control information displayed on UI screens as illustrated in FIGS. 13 to 17 according to a predetermined condition.

Figure 13:
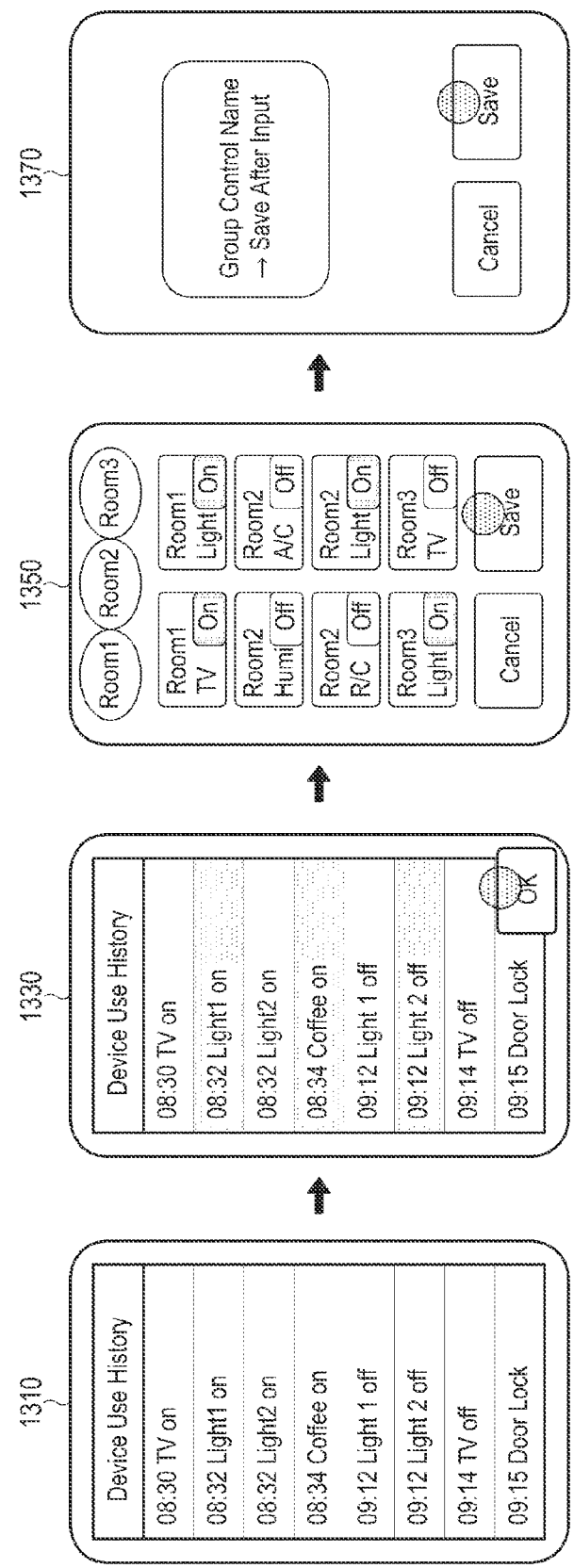
FIGS. 13, 14, 15, 16, and 17 illustrate UI screens provided in the control history mode in a home network system according to an embodiment of the present disclosure.

FIG. 13 illustrates UI screens in the control history mode according to an embodiment of the present disclosure.

Referring to FIG. 13, the user checks control histories (that is, use histories) of home devices and directly selects home devices to be turned on or off Reference numeral 1310 denotes the control histories of home devices, reference numeral 1330 denotes an example of grouping home devices to be turned on/off by the user, reference numeral 1350 denotes the groups, for example, by room, and reference numeral 1370 denotes an example of registering and storing group setting information configured based the control histories.

Figure 14:
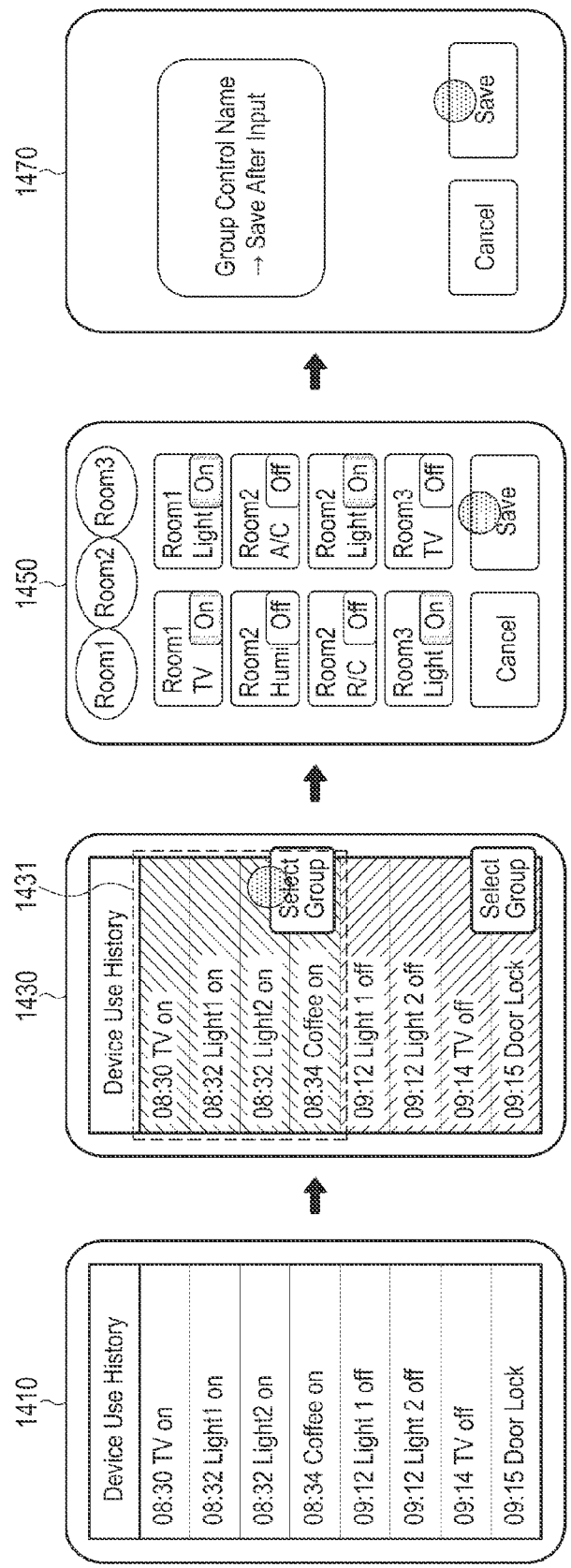

FIG. 14 illustrates UI screens in the control history mode according to an embodiment of the present disclosure. In the example, the starting and ending times of operations of home devices in a specific situation (for example, time-based control histories) are displayed on a UI screen and home devices are grouped for one situation (for example, a selected time zone).

Referring to FIG. 14, reference numeral 1410 denotes time-based control histories of home devices, reference numeral 1430 denotes an example of grouping 1431 home devices to be turned on/off in a selected time zone, reference numeral 1450 denotes the groups, for example, by room, and reference numeral 1470 denotes an example of registering and storing group setting information configured according to the time-based control histories.

If home devices are grouped based on their time-based control histories as described above, a time zone in which home devices are correlated may be extracted and represented as a situation. The correlations may be determined according to a time threshold (for example, if the time threshold is 3 minutes, home devices sequentially turned on within 3 minutes may be determined as correlated). A time zone may be extracted based on this time threshold and one situation (for example, eating, going to the office, or the like) may be defined for the time zone. Then, control commands for home devices satisfying the situation may be grouped and set as one group control command.

Exemplary information that may be used in defining a specific situation based on control histories of home devices may be given as follows.

1) Time zones (AM/PM/Early Morning), door lock (back-home/going-out, and the like), Wi-Fi connection or disconnection between the UE 200 and the HGW 120 (in the case of Wi-Fi connection, it is determined that the user is located inside a home and in the case of Wi-Fi disconnection, it is determined that the user is away from the home), alarm (wake-up/TV watching, and the like), scheduling (vacation and the like), TV (whether the user is in a living room or whether the user is watching a movie), light (whether the user is in a room), a motion sensor (whether the user is in a room), voice recognition (whether the user is in a room), a contact sensor, an illumination sensor, a cleaner (cleaning), an oven/microwave oven (eating), a washing machine, an air conditioner, a fan, and the like.

2) The time difference between events triggering an operation of a home device is compared with a time threshold. If the time difference exceeds the time threshold, the events are defined as different situations.

The following situations may be defined and a time threshold may be set for each situation according to an embodiment of the present disclosure.

Figure 15:
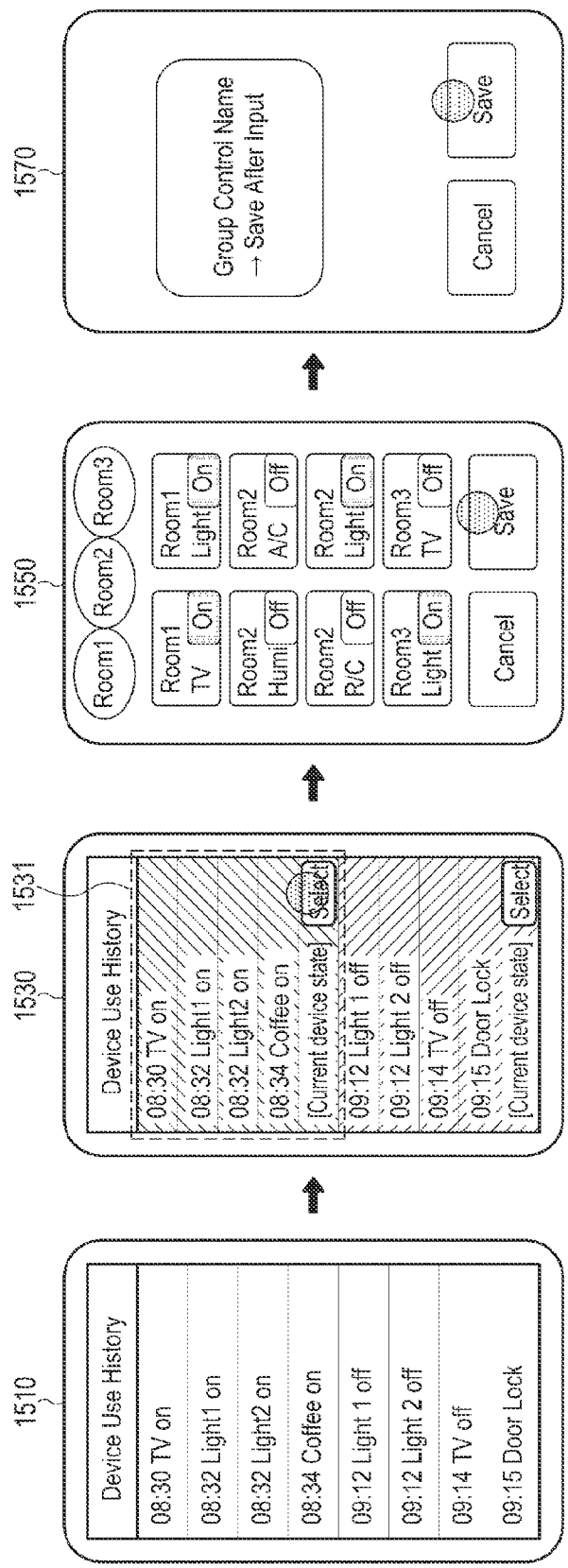

Going-out: {Change to Door Locked & Light Off & TV Off}|Time Threshold
    Back-home: {Change to Door Unlocked & Light On & Motion Sensing}|Time Threshold
    Movie-watching: {TV On & Home Theater On & Media Player Played}|Time Threshold
    Study: {Study Room Light On & TV off}|Time Threshold
    Sleep: {Time Information & Light Off & TV Off & Washing Machine Off}|Time Threshold
    Wake-up: {Alarm On & Light On & Audio On}|Time Threshold
    Vacation: {Schedule Checked & All Devices Off}|Time Threshold
    Cleaning: {Window Opened & Cleaner On & Sound Recognition}|Time Threshold
    Eating: {Oven/Gas Range/Microwave Oven On & Table Light On}|Time Threshold FIG. 15 illustrates UI screens in the control history mode according to an embodiment of the present disclosure. In the example, the moment one situation ends, the operations states of all home devices at a current time are stored and managed.

Referring to FIG. 15, reference numeral 1510 denotes time-based control histories of home devices, reference numeral 1530 denotes an example of grouping 1531 home devices to be turned on/off, after one situation ends, reference numeral 1550 denotes the groups of home devices by room, and reference numeral 1570 denotes an example of registering and storing group setting information configured based on the termination of the one situation. In the embodiment of FIG. 15, home devices may be grouped in a new mode by reflecting the operation states of uncontrolled home devices and the operation states of the home devices may be loaded and stored/edited at the moment a specific situation starts/ends. For example, the operation states of corresponding home devices during a time period spanning from 8:30 to 8:34 over which control commands are correlated in the control histories of the home devices may be generated/edited in a new mode, as indicated by reference numeral 1530.

Figure 16:
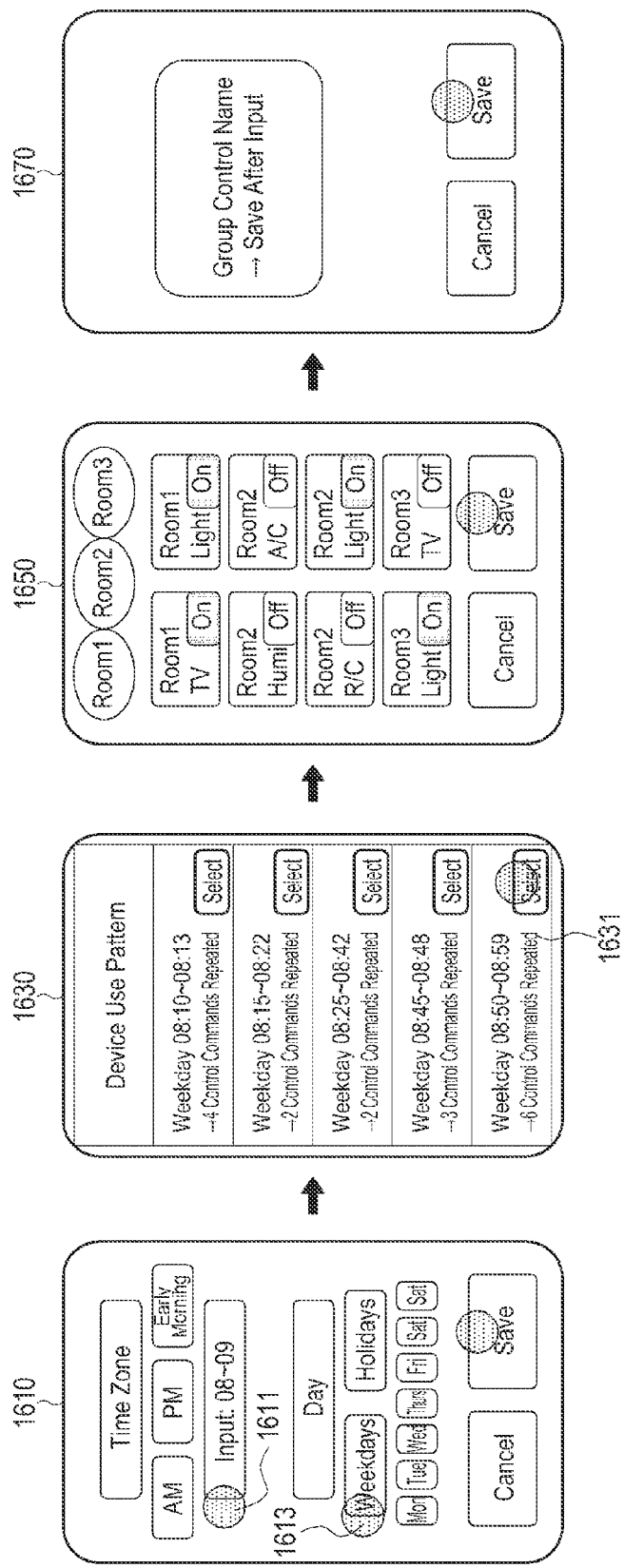

FIG. 16 illustrates UI screens in the control history mode according to an embodiment of the present disclosure. In the example, repeated control commands for home devices are extracted based on information about similar situations by day/time and grouping of the home devices is recommended to the user.

Referring to FIG. 16, reference numeral 1610 denotes a settings screen for displaying control histories of home devices by day/time 1611 and 1613, reference numeral 1630 denotes an example of grouping 1631 home devices having a repetition pattern by extracting repeated control commands by day/time, reference numeral 1650 denotes the groups, for example, by room, and reference numeral 1670 denotes an example of registering and storing group setting information configured based on control commands for the home devices having the repetition pattern.

Figure 17:
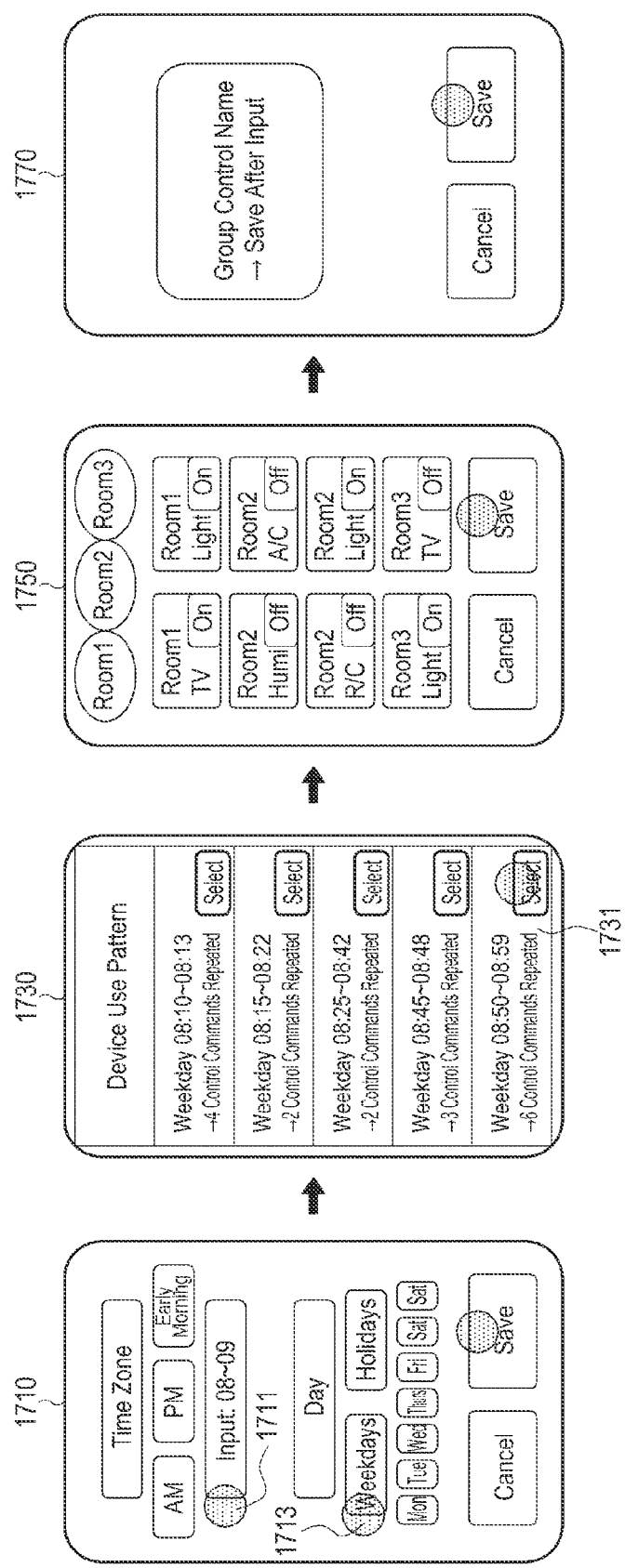

FIG. 17 illustrates UI screens in the control history mode according to an embodiment of the present disclosure. In the example, repeated control states of home devices are extracted based on information about similar situations by day/time and grouping of the home devices is recommended to the user.

Referring to FIG. 17, reference numeral 1710 denotes a settings screen for displaying control histories of home devices by day/time 1711 and 1713, reference numeral 1730 denotes an example of grouping 1731 of home devices having a repetition pattern by extracting repeated control states by day/time, reference numeral 1750 denotes the groups, for example, by room, and reference numeral 1770 denotes an example of registering and storing group setting information configured based on control commands for the home devices having the repetition pattern.

Referring to FIG. 12 again, upon receipt of a group control command based on the group setting information as in the embodiments illustrated in FIGS. 13 to 17 in operation 1213, the HGW 120 transmits a device control command to the home devices 110-1 and 110-2 of the group corresponding to the group control command in order to control operations of the home devices 110-1 and 110-2 in operation 1215.

In the embodiments illustrated in FIGS. 12 to 17, the control histories of home devices may include detailed operation states of the home devices. In this case, the detailed operation states of the home devices as well as their on/off states may be set based on the control histories stored when the control history mode is executed. The most frequency operation states of the home devices may be set as the detailed operation states of the home devices. For example, if a home device is a heater, detailed operation states such as the most frequent heating temperature, heating time, and the like as well as an on/off state may be set for the heater. The user may also set the detailed operation states of the home device through a UI.

According to the embodiments illustrated in FIGS. 12 to 17, a group control command may be extracted/generated/stored/edited based on control histories of home devices. When a group control command is generated, a time period expected to correspond to a specific situation may be provided to a user, thereby increasing convenience. In addition, the operation states of home devices in a home at the moment the user provides a specific situation to the home, as well as the histories of controlling the home devices by the user may be stored and provided to the user.

While the embodiments illustrated in FIGS. 9 to 12 have been described in the context that on/off states are the operation states of home devices, frequently used functions of the home devices (for example, cleaning start/end for a robot cleaner, recording start/end for an IP camera, and the like) may be displayed on a UI screen as the operation states of the home devices.

While the embodiments illustrated in FIGS. 9 to 12 have been described in the context that the UE 200 transmits a group control command to the HGW 120, the group control command may be input directly to the HGW 120 or a home device such as a smart TV equipped with the HGW 120. While the embodiments illustrated in FIGS. 9 to 12 have been described in the context of a group control scheme in which the HGW 120 checks a group control command and transmits a device control command to home devices of a corresponding group from among total home devices, if the HGW 120 transmits a group control command to all home devices, each home device receiving the group control command may interpret the group control command and determine whether to operate.

An embodiment of using correlations between home devices in grouping the home devices based on their control histories has been described before.

Regarding correlations, other home devices operating in conjunction with each home device may be represented, for example, as a matrix. If a repeated pattern exists or a time threshold is satisfied, home devices may be grouped adaptively according to their use patterns by weighting them. Once correlations between the home devices are determined, control history information may be extracted in a descending order of correlations and provided to the user. For example, if the user selects one home device for group control, other selectable home devices may be displayed sequentially in a descending order of correlations with the selected home device and the user may selects home devices to be grouped into the same group from among the displayed home devices.

According to the foregoing embodiments of the present disclosure, a mode for group control of home devices may be easily set in a user-customized manner in the case of the one-touch mode. In the one-touch mode, once the user groups home devices, a list of the grouped home devices for group control may be modified at a next time, for convenient use. Each family member may store/use all cases such as eating, going-out, back-home, study, and the like according the individual family member's taste and group information may be shared between family members.

In the control history mode, control commands or control states of home devices that are repeated in a corresponding situation may be extracted from control histories of the home devices in consideration of a predetermined condition or their correlations, to thereby improve a related-art complicated group control method. In addition, control commands or control states of home devices having a repetition pattern may be extracted by collecting and comparing the control histories of the home devices by time/day and recommended to the user. Thus, a group control command for each situation may be provided according to the user's taste.

In the foregoing embodiments of the present disclosure, an HGW controls home devices on a group basis using operation states information about the home devices received from the home devices. Now, a description will be given of another embodiment of the present disclosure in which an HGW controls home devices on a group basis using outdoor information related to an outdoor environment change (for example, environment information such as fine dust information, disaster information announcing a disaster emergency, weather information notifying heavy rain, heavy snow, or heat wave, and the like).

In another embodiment, outdoor information may be provided by a server of a public facility that manages environment information, disaster information, weather information, and the like or a server of an operator that collects environment information, disaster information, weather information, and the like and provides them as an information service. Servers of a public facility, an operator, and the like will be referred to as external servers.

Information preset between an HGW and an external server from among environment information, disaster information, weather information, and the like may be provided and may be detailed by region, by time, by extent, or the like.

Figure 18:
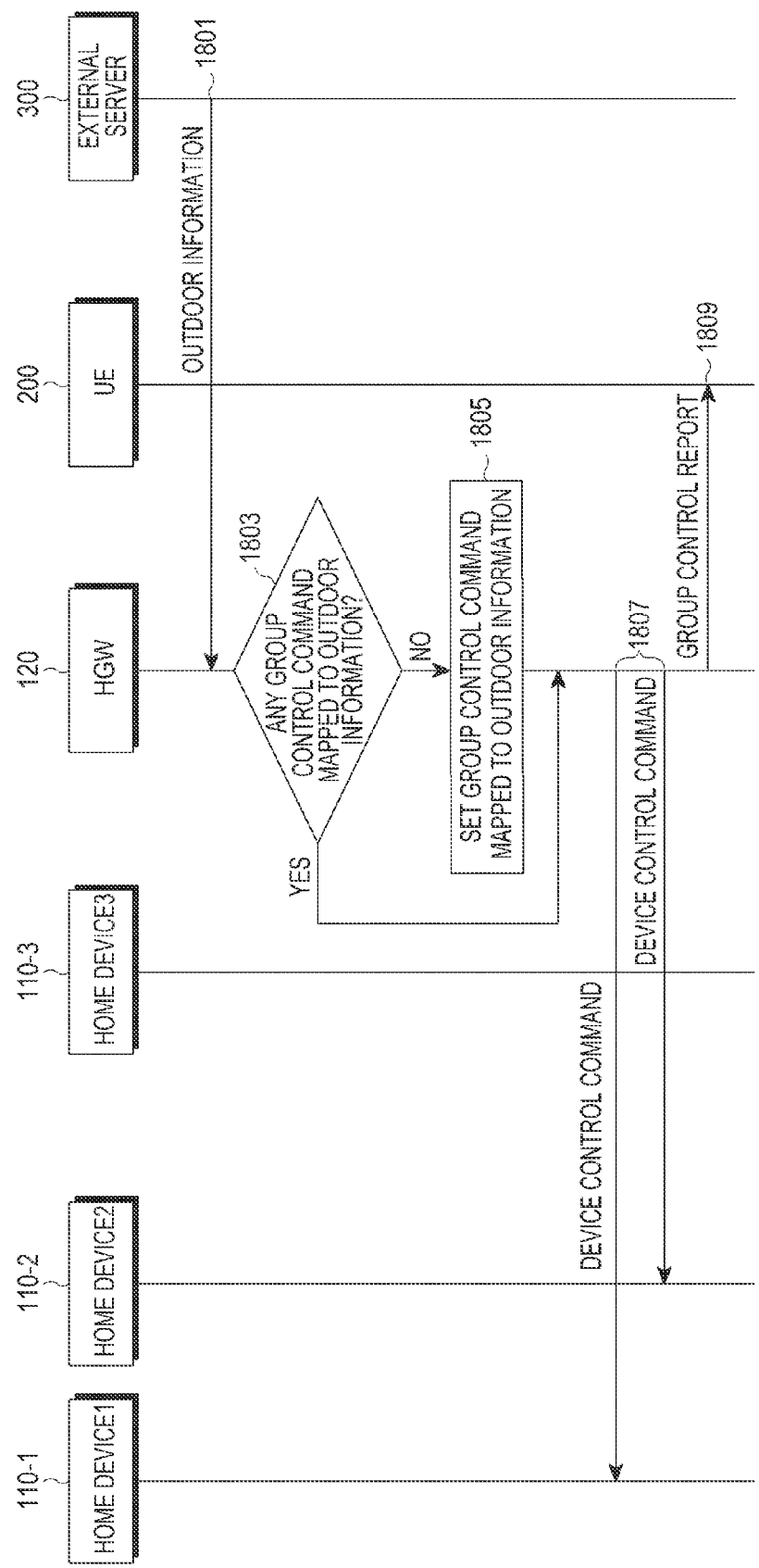
FIG. 18 is a diagram illustrating a signal flow for a method for controlling operations of home devices on a group basis using external information in a home network system according to an embodiment of the present disclosure.

FIG. 18 is a diagram illustrating a signal flow for a group control method for controlling operations of home devices on a group basis using external information in a home network system according to an embodiment of the present disclosure. For the convenience of description, it is assumed that all home devices are home device 1 110-1, home device 2 110-2, and home device 3 110-3.

Referring to FIG. 18, the HGW 120 may receive outdoor information such as environment information, disaster information, or weather information, which is hard to sense or collected in a home, from an external server 300 periodically or by push service in operation 1801. For example, the HGW 120 may receive outdoor environment information hard to sense in a home, such as a fine dust alarm, an earthquake forecast, and the like from the external server 300 by push service. Upon receipt of the outdoor information in operation 1803, the HGW 120 determines (checks) whether there is a group control command mapped to the received outdoor information. For this purpose, the HGW 120 may store group control commands and related group setting information that are pre-mapped to outdoor information representing various situations, and may control operations of the home devices 110-1 and 110-2 of a group corresponding to each group control command. Therefore, in the presence of a group control command mapped to the received outdoor information in operation 1803, the HGW 120 transmits a device control command to the home devices 110-1 and 110-2 to control operations of the home devices 110-1 and 110-2 belonging to the group corresponding to the group control command in operation 1807.

For example, it is assumed that a fine dust alarm is provided as outdoor information and a humidifier, a robot cleaner, and an air purifier are grouped into the same group from among home devices in order to keep the indoors clean and comfortable. In this case, upon receipt of the fine dust alarm by push service, the HGW 120 transmits a device control command to the home devices, that is, the humidifier, the robot cleaner, and the air purifier according to a group control command mapped to the fine dust alarm, and the humidifier, the robot cleaner, and the air purifier reduce an indoor fine dust density by their operations. On the other hand, in the absence of a group control command mapped to the received outdoor information in operation 1803, the HGW 120 analyzes control history information, for example, according to the embodiment of FIG. 12 and sets a group control command by setting group setting information registered and stored at a nearest time point to the reception time point of the outdoor information (time, season, and the like) as group setting information corresponding to the outdoor information in operation 1805. Then the HGW 120 transmits a device control command to the home devices 110-1 and 110-2 according to the set group control command in operation 1807. The HGW 120 may report execution of group control based on the outdoor information to the UE 200 in operation 1809. While not shown in FIG. 18, it may be contemplated as another embodiment that in the absence of a group control command mapped to the received outdoor information in operation 1803, the HGW 120 notifies the user of the reception of the outdoor information instead of directly setting a group control command and then controls operations of home devices by receiving a group control command set by the UE 200 as in the embodiments of FIGS. 12 to 16.

The embodiment of FIG. 18 may be implemented in combination with the embodiment of FIG. 9 or 12. In this case, operation collision may be mitigated by prioritizing group controls based on outdoor information. For example, if outdoor information is received during operations of home devices in progress in the control history mode, the control history-mode group control may be discontinued and instead, outdoor information-based group control may be performed. Upon completion of the group control based on the outdoor information, the group control in the control history mode may resume.

External outdoor information as well as control history information about home devices may be used in the embodiment of FIG. 18, thereby efficiently controlling operations of the home devices.

The proposed method and apparatus for controlling home devices on a group basis in a home network system may be implemented as computer-readable code in a non-transitory computer-readable recording medium. The non-transitory computer-readable recording medium may include any kind of recording device storing computer-readable data. Examples of the recording medium may include ROM, RAM, optical disk, magnetic tape, floppy disk, hard disk, non-volatile memory, and the like, and may also include the medium that is implemented in the form of carrier waves (for example, transmission over the Internet). In addition, the non-transitory computer-readable recording medium may be distributed over the computer systems connected over the network, and computer-readable codes may be stored and executed in a distributed manner.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling home devices on a group basis in a home network system, the method comprising:
obtaining operation state information about a plurality of home devices;
generating use histories of the plurality of home devices based on the obtained operation state information;
grouping one or more home devices from among the plurality of home devices into a home device group based on whether the one or more home devices satisfy a grouping condition;
receiving a group control command for the home device group; and
controlling operations of the one or more home devices in the home device group according to the received group control command,
wherein the use histories are used to determine whether the one or more home devices satisfy the grouping condition, and
wherein the grouping condition includes a first grouping condition that a corresponding home device operates within a predetermined time duration.

2. The method of claim 1, wherein the grouping condition includes a second grouping condition that a corresponding home device operate in a specific situation.

3. The method of claim 1, wherein the home device group is generated from a list of home devices extracted in a descending order of correlations of the one or more home devices based on the use histories.

4. The method of claim 1, wherein the home device group is generated from a list of home devices operating within a time period set based on the use histories.

5. The method of claim 1, wherein the group control command is received from a User Equipment (UE) that received the use histories.

6. The method of claim 1, further comprising receiving group setting information about the home device group from a User Equipment (UE).

7. The method of claim 1, wherein the group control command includes identification information about the one or more home devices in the home device group and control contents for each of the one or more home devices.

8. The method of claim 1, wherein the generating of the use histories further comprises generating the use histories according to a predetermined condition.

9. The method of claim 1, wherein the group control command for the home device group is editable by an input from a user equipment (UE).

10. The method of claim 1, wherein an operation mode for controlling the home device group is set by a room.

11. A home gateway for controlling home devices on a group basis in a home network system, the home gateway comprising:
a network interface configured to communicate with a plurality of home devices; and
a controller configured to:
obtain operation state information about the plurality of home devices,
generate use histories of the plurality of home devices based on the accumulated operation state information,
group one or more home devices from among the plurality of home devices into a home device group based on whether the one or more home devices satisfy a grouping condition,
control to receive a group control command for the home device group, and
control operations of the one or more home devices in the home device group according to the received group control command,
wherein the use histories are used to determine whether the one or more home devices satisfy the grouping condition, and
wherein the grouping condition includes a first grouping condition that a corresponding home device operates within a predetermined time duration.

12. The home gateway of claim 11, wherein the grouping condition includes a second grouping condition that a corresponding home device operates in a specific situation.

13. The home gateway of claim 11, wherein the home device group is generated from a list of home devices extracted in a descending order of correlations of the one or more home devices based on the use histories.

14. The home gateway of claim 11, wherein the home device group is generated from a list of home devices operating within a time period set based on the use histories.

15. The home gateway of claim 11, wherein the controller is further configured to receive the group control command from a User Equipment (UE) that received the use histories.

16. The home gateway of claim 11, wherein the controller is further configured to receive group setting information about the home device group from a User Equipment (UE).

17. The home gateway of claim 11, wherein the group control command includes identification information about the one or more home devices in the home device group and control contents for each of the one or more home devices.

18. The home gateway of claim 11, wherein the controller is further configured to generate the use histories according to a predetermined condition.

19. The home gateway of claim 11, wherein the group control command for the home device group is editable by an input from a user equipment (UE).

20. The home gateway of claim 11, wherein an operation mode for controlling the home device group is set by a room.

* * * * *